US012762545B2

(12) United States Patent
Embrechts et al.

(10) Patent No.: US 12,762,545 B2
(45) Date of Patent: Oct. 13, 2026

(54) CONCEPT FOR RECOVERING ACCESS TO A CRYPTOCURRENCY WALLET ON A REMOTE SERVER

(71) Applicant: Sony Group Corporation, Tokyo (JP)

(72) Inventors: Hugo Embrechts, Stuttgart (DE); Michele Minelli, Stuttgart (DE); Dimitri Torfs, Stuttgart (DE); Guillaume Bonnot, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/848,553

(22) PCT Filed: Mar. 27, 2023

(86) PCT No.: PCT/EP2023/057808
§ 371 (c)(1),
(2) Date: Sep. 19, 2024

(87) PCT Pub. No.: WO2023/186788
PCT Pub. Date: Oct. 5, 2023

(65) Prior Publication Data

US 2025/0209445 A1 Jun. 26, 2025

(30) Foreign Application Priority Data

Mar. 30, 2022 (EP) .................................... 22165293

(51) Int. Cl.
*G06Q 20/36* (2012.01)
*G06Q 20/38* (2012.01)

(52) U.S. Cl.
CPC ..... *G06Q 20/3678* (2013.01); *G06Q 20/3829* (2013.01)

(58) Field of Classification Search
CPC ............ G06Q 20/3678; G06Q 20/3829; G06F 21/33; G06F 21/64; H04L 2209/56;
(Continued)

(56) References Cited

U.S. PATENT DOCUMENTS 10,790,976 B1 * 9/2020 Raevsky .............. G06Q 20/065
11,170,363 B1 * 11/2021 Maeng ............... G06Q 20/3823
(Continued)

FOREIGN PATENT DOCUMENTS

WO 2020/006425 A1 1/2020

OTHER PUBLICATIONS

Shuangyu et al, A Social-Network-Based Cryptocurrency Wallet-Management Scheme, 2018, IEEEAccess, vol. 6, 7654-7663 (Year: 2018).*

(Continued)

*Primary Examiner* — Jalatee Worjloh
(74) *Attorney, Agent, or Firm* — XSENSUS LLP

(57) ABSTRACT

This invention relates to a system for recovering access to a cryptocurrency wallet on a remote server. It introduces a wallet control apparatus, method, and system for registering a new cryptographic secret at a wallet hosted in a trusted execution environment on a server. The apparatus generates a new cryptographic secret for the wallet, retrieves a second cryptographic secret from another remote server after authenticating the wallet owner, and uses this second secret to sign a control instruction. This instruction is sent to the server to register the new cryptographic secret, enabling secure wallet control.

20 Claims, 14 Drawing Sheets

(58) Field of Classification Search
CPC ... H04L 9/0894; H04L 9/3255; H04L 9/3263; H04L 9/50
See application file for complete search history.

(56) References Cited

U.S. PATENT DOCUMENTS

| | | | |
|---|---|---|---|
| 2019/0220852 | A1 | 7/2019 | Black et al. |
| 2019/0220858 | A1 | 7/2019 | Weight et al. |
| 2020/0005282 | A1 | 1/2020 | Kim |

OTHER PUBLICATIONS

Agarwal, Rounak, "A Trusted-Hardware Backed Secure Payments Platform for Android," Oct. 2021, Computer Science and Automation Indian Institute of Science Bangalore-560 012 (India) (Year: 2021).*
International Search Report and Written Opinion mailed on Jun. 27, 2023, received for PCT Application PCT/EP2023/057808, filed on Mar. 27, 2023, 08 pages.
Nathan Reiff, "20% of All BTC is Lost, Unrecoverable, Study Shows", Investopedia, Available online @ https://www.investopedia.com/news/20-all-btc-lost-unrecoverable-study-shows/, Jun. 25, 2019, pp. 1-6.
Argent, "The best of Ethereum. A fraction of the cost.", The Best Ethereum wallet for DeFi and NFTs, Downloaded on Sep. 18, 2024, pp. 1-11.
"Loopring 路印 loopring protocol 3.6 The first Layer2 Decentralized trading Platform", Loopring Wallet, Downloaded on Sep. 18, 2024, pp. 1-3.
Sealblock, "Secure your digital assets with SealBlock™", SealBlock™ Website—Digital Wallet Technology Utilizing Secure Enclave, Downloaded on Jan. 7, 2022, pp. 1-9.
Sealblock, "Individuals are using SealBlock to protect their cryptocurrency investments and get access to crypto financial service" Personal Digital Wallets, Downloaded on Jan. 7, 2022, pp. 1-4.
Sealblock, "Organizations use SealBlock to protect their private keys securely sign transactions", Enterprise Hot Wallet, Downloaded on Jan. 7, 2022, pp. 1-3.
Max Skibinsky, "How Secure Enclave gives you Instant Access to your Digital Assets with Hot Storage Vault", Nov. 15, 2021, pp. 1-25.
"Why we need wide adoption of social recovery wallets", Jan. 11, 2021, pp. 1-6.
Yao, "Smart Wallet: New Paradigm for Blockchain Account System", Jun. 12, 2020, 11 pages.

* cited by examiner

CONCEPT FOR RECOVERING ACCESS TO A CRYPTOCURRENCY WALLET ON A REMOTE SERVER

CROSS-REFERENCE TO RELATED APPLICATIONS

This application is a national stage application, pursuant to 35 U.S.C. § 371, of International Patent Application No. PCT/EP2023/057808, filed Mar. 27, 2023, which claims priority to European Patent Application No. 22165293.6, filed Mar. 30, 2022, the entire contents of each are incorporated herein by reference.

FIELD

Examples relate to a concept for recovering access to a cryptocurrency wallet on a remote server, and in particular to a wallet control apparatus, method, computer program and system for registering a new cryptographic secret at a cryptocurrency wallet hosted in a trusted execution environment on a server.

BACKGROUND

Cryptocurrencies, i.e., currencies that exist digitally and use cryptography to secure transactions, e.g., on a blockchain, are a field of research and development. Cryptocurrency transactions usually involve the use of a so-called wallet, which is a computer program being used to store and manage cryptographic secrets that can be used to sign cryptocurrency transactions.

There are different classes of cryptocurrency wallets. A first type of wallet is referred to as "self-custodial wallet". In self-custodial wallets, the wallet owners do not rely on a third party to store and operate the private keys that control the assets in the wallet. There are different types of self-custodial wallets, such as hardware wallets, also called cold storage, web or mobile wallets, and desktop wallets. The recovery of lost, stolen, or broken devices is typically possible by using a recovery phrase (often 24 words) with which the keys can be regenerated. This recovery phrase must be stored in a safe place. Self-custodial wallets may be considered to carry a high risk for permanent loss because of human errors. A study shows that over 20% of all Bitcoin (a cryptocurrency) is lost permanently, e.g., due to loss of device or due to human error. This runs counter to the aim of making it easier for humans to engage in very complicated tasks without having to exert extreme mental effort or live in constant fear of making mistakes.

A second type of wallet is referred to as "custodial wallet". When using a custodial wallet, the wallet owner delegates the storage and operation of private keys that control assets in a wallet to a third party. Typically, these third parties, such as big exchange markets, do not store the assets in individual wallets but keep them in large pools. In this respect, the wallet is more like an account on the bank. However, custodial wallets may be vulnerable to large-scale attacks on custodial wallet providers. Moreover, the risk of bankruptcies of custodial wallet providers (sometimes because of large scale attacks) is non-negligible.

A third type of wallet is referred to as "smart contract wallet". The assets in a smart contract-based wallet are controlled by an (Ethereum) smart contract. Such smart contract wallets provide a number of different features, such as multi-signature authorization, rate limits, social recovery (friends can help recover the wallet), temporary locking of wallet, etc. However, smart contract wallets may be considered to be still rather sensitive to human errors (so that the wallet owners need to be well organized). The adaptation of concepts such as smart contracts is growing.

In Ethereum, transactions (ETH transfers, ERC20 transfers, smart contract calls) are issued with signatures signed by the private key corresponding to the public key associated with the account. In social recovery, 3-5 guardians can change which public key is associated with the account. In turn, the signing key can be used to sign a message that could change guardians after a delay (often 1-3 days).

There may be a desire for an improved concept for a cryptocurrency wallet, which reduces the risks for the wallet owners.

SUMMARY

This desire is addressed by the subject-matter of the independent claims.

Various examples of the present disclosure are based on the finding, that a new type of wallet, called "guarded (crypto) wallet" along with a key recovery mechanism, can be used to provide a cryptocurrency wallet that reduces the risks for the wallet owners. In the proposed concept, the individual wallets of the wallet owners are managed and executed within a trusted execution environment on a first remote server. Cryptographic secrets stored in the wallet and in a wallet control application (wallet control apparatus) being operated by the wallet owner create a link between the wallet and the wallet control application and allow the wallet owner to sign instructions for controlling the cryptocurrency wallet from their wallet control application. If the wallet control application is lost, e.g., as the computer or mobile device being used to execute the wallet control application fails or is lost, or as the application is removed in error, access can be restored via a second remote server, which hosts a second cryptographic secret that acts as a recovery key and can be used to install a new cryptographic secret between the wallet control application and the wallet being hosted on the first remote server. The second cryptographic secret can be obtained upon authentication of the owner of the wallet vis-à-vis the second remote server (e.g., using a government-backed identification scheme). This results in a concept for a cryptographic wallet, where the owner remains in sole control of the cryptographic wallet, and where access to the wallet can be recovered in case it is temporarily lost due to loss or failure of a device or due to erroneous removal of the application.

Various aspects of the present disclosure relate to a wallet control apparatus. The wallet control apparatus comprises processing circuitry configured to register a new first cryptographic secret at a cryptocurrency wallet hosted in a trusted execution environment on a first remote server. Registering the new first cryptographic secret comprises generating the first cryptographic secret. Registering the new first cryptographic secret comprises obtaining a second cryptographic secret from a second remote server upon authentication of an owner of the cryptocurrency wallet vis-à-vis the second remote server. Registering the new first cryptographic secret comprises signing a control instruction for registering the first cryptographic secret at the cryptocurrency wallet using the second cryptographic secret. Registering the new first cryptographic secret comprises transmitting the signed control instruction for registering the first cryptographic secret at the cryptocurrency wallet to the first remote server. The processing circuitry is configured to provide instructions for controlling the cryptocurrency wallet to the first remote server, the instructions being cryptographically protected based on the first cryptographic secret. In the proposed concept, the second cryptographic secret, which can be used to register the new first cryptographic secret at the wallet, can be recovered from the second remote server upon authentication of the owner vis-à-vis the second remote server. This enables recovery of access to the wallet when the previously used first cryptographic secret is lost.

For example, the processing circuitry may be configured to register the new first cryptographic secret after loss of a previously used first cryptographic secret. Thus, a new first cryptographic secret can be registered after loss of the previously used first cryptographic secret.

In cryptography, there are different approaches. In some examples, an approach called public key authentication is used, which is based on a key pair comprising a private key and a public key. The private key is generally held by the owner of the key, while the public key can be handed out and can be used to verify messages signed by the private key. For example, the first cryptographic secret may be a private key of a device authorization key pair. The processing circuitry may be configured to derive a public key of the device authorization key pair from the private key of the device authorization key pair. The processing circuitry may be configured to include the public key of the device authorization key pair in the control instruction for registering the first cryptographic secret. In other words, after generating the private key, a corresponding public key (for verifying instructions signed using the private key) may be transmitted to the wallet and stored there for verification of instructions provided by the wallet control apparatus.

Similarly, the second cryptographic secret may be a private key of a device registration key pair, with a public key of the device registration key pair being known to the cryptocurrency wallet. At the cryptocurrency wallet, the public key of the device registration key pair may be used to verify instructions, such as the control instructions for registering the new first cryptographic secret, signed using the private key of the device registration key pair.

For example, the processing circuitry may be configured to obtain a response from the first remote server in response to the signed control instruction for registering the first cryptographic secret at the cryptocurrency wallet, with the response comprising a confirmation of the cryptocurrency wallet if the private key of the device registration key pair matches the public key of the device registration key pair stored in the cryptocurrency wallet. In other words, if the registration of the new first cryptographic secret is successful, an acknowledgement may be provided by the wallet. This also serves as acknowledgements that the private key of the device registration key pair is valid for registering a new first cryptographic secret.

The control instruction for registering the first cryptographic secret at the cryptocurrency wallet may comprise a first instruction for removing a previously used first cryptographic secret from the cryptocurrency wallet and a second instruction for registering the new first cryptographic secret at the cryptocurrency wallet. In other words, the previously used first cryptographic secret may be removed, which may increase the security in case the device comprising the previously used first cryptographic secret was lost.

In some examples, the processing circuitry may be configured to authenticate the owner of the cryptocurrency wallet vis-à-vis the second remote server by providing a signed identification certificate to the second remote server. The signed identification certificate may be signed by an independent entity. The processing circuitry may be configured to obtain the second cryptographic secret in response to the authentication. In other words, the wallet control apparatus may authenticate the owner vis-à-vis the remote server.

For example, the processing circuitry may be configured to obtain the signed identification certificate from the independent entity. Thus, the signed identification certificate may be recovered from the independent entity upon loss of the signed identification certificate (e.g., if the previously used device has failed or is lost).

In some examples, the processing circuitry is configured to include the signed identification certificate with a subset of instructions for controlling the cryptocurrency wallet. For example, some instructions, such as the setting and resetting of rate limits, or the instruction to register a new first cryptographic secret, may be protected by this additional layer of security.

Alternatively, the authentication of the owner of the cryptocurrency wallet vis-à-vis the second remote server is performed outside the wallet control apparatus. For example, the authentication may be performed in person, to further increase the security of the key recovery.

Some aspects of the present disclosure relate to a mobile device comprising the wallet control apparatus presented above. Digital transactions, such as digital cryptocurrency transactions, are often performed from mobile devices, such as a smartphones.

Various aspects of the present disclosure relate to a system comprising the wallet control apparatus introduced above and the second remote server. The second remote server comprises storage circuitry configured to store the second cryptographic secret. The second remote server comprises processing circuitry configured to provide the second cryptographic secret in response to authentication of the owner of the cryptocurrency wallet vis-à-vis the second remote server. Thus, the second remote server may recover the second cryptographic secret upon authentication of the owner vis-à-vis the second remote server.

In some examples, as outlined in connection with the wallet control apparatus, the processing circuitry of the second remote server may be configured to authenticate the owner vis-à-vis the second remote server based on a signed identification certificate of the owner and based on information on an identity of the owner of the cryptocurrency wallet stored on the second remote server, with the signed identification certificate being signed by an independent entity. For example, the information on the identity of the owner may be used to verify the signed identification certificate.

For example, the signed identification certificate may be provided by the wallet control apparatus. The processing circuitry of the second remote server may be configured to obtain the signed identification certificate from the wallet control apparatus. This may speed up recovery of the second cryptographic secret.

Alternatively, the processing circuitry of the second remote server may be configured to obtain the signed identification certificate from another entity separate from the wallet control apparatus. For example, the authentication may be performed in person, e.g., using a smart-card and a secret code, to further increase the security of the key recovery.

To enable recovery of the signed identification certificate, or rather issuance of a new certificate in in case of loss, the signed identification certificate may be derived from a trust anchor, e.g., a trust anchor provided by a government agency. For example, the signature of the signed identification certificate may be derived from a trust anchor. The processing circuitry of the second remote server may be configured to verify the signed identification certificate based on a public key of the trust anchor.

In some examples, the system comprises multiple second remote servers. For example, the system may comprise two or more second remote servers. The processing circuitry of the wallet control apparatus may be configured to obtain the second cryptographic secret from the two or more second remote servers. This may provide additional redundancy or additional safety, depending on whether the multiple second remote servers store the entire second cryptographic secret or store parts of the second cryptographic secret.

For example, the processing circuitry of the wallet control apparatus may be configured to select one of the two or more second remote servers, and to obtain the second cryptographic secret from the selected second remote server. In this case, the two or more second remote servers may provide additional redundancy.

Alternatively, or additionally, the processing circuitry of the wallet control apparatus may be configured to obtain two or more parts of the second cryptographic secret from the two or more remote servers, and to combine the two or more parts to obtain the second cryptographic secret. In this case, the security may be increased, as the owner of the wallet needs to authenticate vis-à-vis multiple second remote servers, e.g., in person.

In some examples, the system further comprises the first remote server. The first remote server may comprise processing circuitry being configured to provide the trusted execution environment, and to perform operations concerning the cryptocurrency wallet inside the trusted execution environment. The first remote server is thus used to securely host the cryptocurrency wallet.

As outlined in connection with the wallet control apparatus, the first cryptographic secret may be a private key of a device authorization key pair. The control instruction for registering the first cryptographic secret may comprise the public key of the device authorization key pair. The processing circuitry of the first remote server may be configured to store the public key of the device authorization key pair in the cryptocurrency wallet in the trusted execution environment. The public key of the device authorization key pair may subsequently be used to verify instructions received from the wallet control apparatus.

For example, the second cryptographic secret may be a private key of a device registration key pair. The processing circuitry of the first remote server may be configured to store the public key of the device registration key pair in the cryptocurrency wallet in the trusted execution environment, and to verify the signed control instruction for registering the first cryptographic secret based on the public key of the device registration key pair. Thus, the counterpart of the second cryptographic secret may be (permanently) stored in the cryptocurrency wallet.

As outlined above, transactions on the cryptocurrency blockchain are signed using a cryptocurrency key (pair). This cryptocurrency key (pair) is generally stored inside the cryptocurrency wallet. The processing circuitry of the first remote server may be configured to store a third cryptographic secret for signing transactions on a cryptocurrency blockchain in the cryptocurrency wallet in the trusted execution environment, and to sign the transactions on the cryptocurrency blockchain using the third cryptographic secret.

In various examples, the processing circuitry of the first remote server is configured to store a public key of a trust anchor and to store information on an identity of the owner of the cryptocurrency wallet in the wallet in the trusted execution environment. These two pieces of information may then be used to verify a signed identification certificate of the owner of the cryptocurrency wallet.

For example, a subset of instructions for controlling the cryptocurrency wallet may require inclusion of a signed identification certificate of the owner of the cryptocurrency wallet, with the signature of the signed identification certificate being derived from the trust anchor. The processing circuitry of the first remote server may be configured to verify the subset of instructions based on the information on the signed identification certificate, based on the information on the identity of the owner of the cryptocurrency wallet and based on the public key of the trust anchor. In other words, some critical instructions, such as the setting of rate limits or the registration of a new first cryptographic secret, may be additionally protected by the signed identification certificate being provided by the owner of the cryptocurrency wallet.

In some examples, the second remote server may be configured to provide confirmation information on the second cryptographic secret being stored by the second remote server to the first remote server, the confirmation information including the information on the identity of the owner of the cryptocurrency wallet. After the confirmation is provided, the setup of the cryptocurrency wallet may be deemed completed.

In general, software code running in the trusted execution environment may be audited by a third party. This may ensure that no data is exfiltrated by the first remote server.

Various aspects of the present disclosure relate to a wallet control method. The method comprises registering a new first cryptographic secret at a cryptocurrency wallet hosted in a trusted execution environment on a first remote server. Registering a new first cryptographic secret comprises generating the first cryptographic secret. Registering a new first cryptographic secret comprises obtaining a second cryptographic secret from a second remote server upon authentication of an owner of the cryptocurrency wallet vis-à-vis the second remote server. Registering a new first cryptographic secret comprises signing a control instruction for registering the first cryptographic secret at the cryptocurrency wallet using the second cryptographic secret. Registering a new first cryptographic secret comprises transmitting the signed control instruction for registering the first cryptographic secret at the cryptocurrency wallet to the first remote server. The method comprises providing instructions for controlling the cryptocurrency wallet to the first remote server, the instructions being cryptographically protected based on the first cryptographic secret.

Various aspects of the present disclosure relate to a computer program having a program code for performing the above method, when the computer program is executed on a computer, a processor, or a programmable hardware component.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
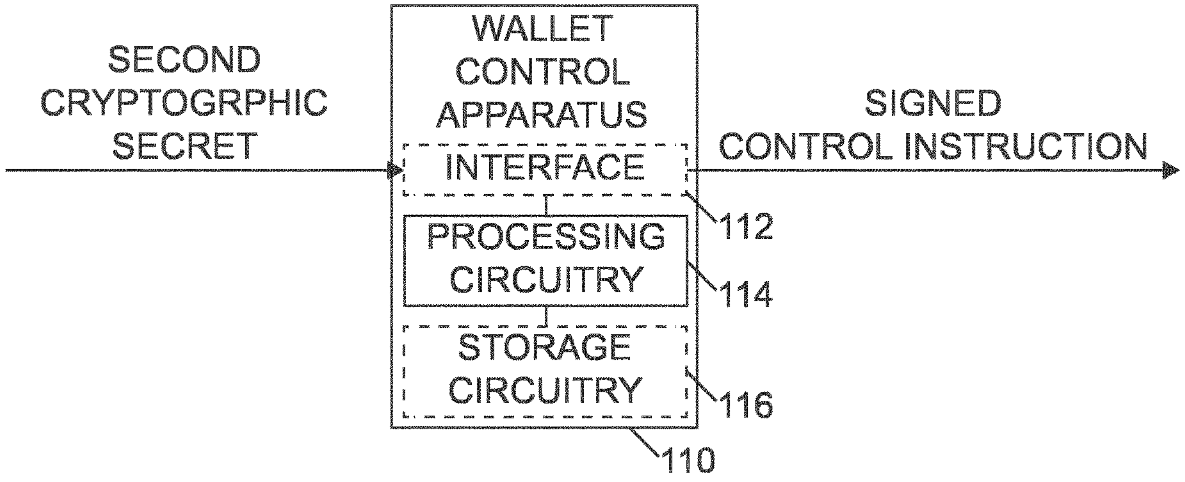
FIG. 1*a* shows a block diagram of an example of a wallet control apparatus.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1*a* shows a block diagram of an example of a wallet control apparatus 110. The wallet control apparatus 110 comprises processing circuitry 114, which is configured to provide the functionality of the control apparatus 110. Optionally, the wallet control apparatus 110 further comprises an interface 112 (e.g., interface circuitry) for communicating with other entities, such as a first remote server 120 and/or a second remote server 130 (shown in FIG. 1*c*), and/or a storage circuitry 116 for storing information. The processing circuitry 114 shown in FIGS. 1*a* and 1*c* is coupled with the optional interface 112 and the optional storage circuitry 116. For example, the processing circuitry 114 may be configured to provide the functionality of the wallet control apparatus 110 in conjunction with the interface 112 (for communicating) and/or with the storage circuitry 116 (for storing and retrieving information). For example, the wallet control apparatus 110 may be part of a computer system, such as a personal computer, a tablet computer, or a smartphone. The functionality of the wallet control apparatus may be provided as software, e.g., as a wallet control application being executed by the respective computer system.

The processing circuitry 114 is configured to register a new first cryptographic secret at a cryptocurrency wallet hosted in a trusted execution environment on the first remote server 120 (shown in FIG. 1*c*). Registering the new first cryptographic secret comprises generating the first cryptographic secret. Registering the new first cryptographic secret comprises obtaining (e.g., receiving, via the interface 112) a second cryptographic secret from the second remote server 130 (shown in FIG. 1*c*) upon authentication of an owner of the cryptocurrency wallet vis-à-vis the second remote server. Registering the new first cryptographic secret comprises signing a control instruction for registering the first cryptographic secret at the cryptocurrency wallet using the second cryptographic secret. Registering the new first cryptographic secret comprises transmitting (e.g., via the interface 112) the signed control instruction for registering the first cryptographic secret at the cryptocurrency wallet to the first remote server. The processing circuitry 114 is configured to provide (e.g., transmit, via the interface 112) instructions for controlling the cryptocurrency wallet to the first remote server, the instructions being cryptographically protected based on the first cryptographic secret.

Figure 1B:
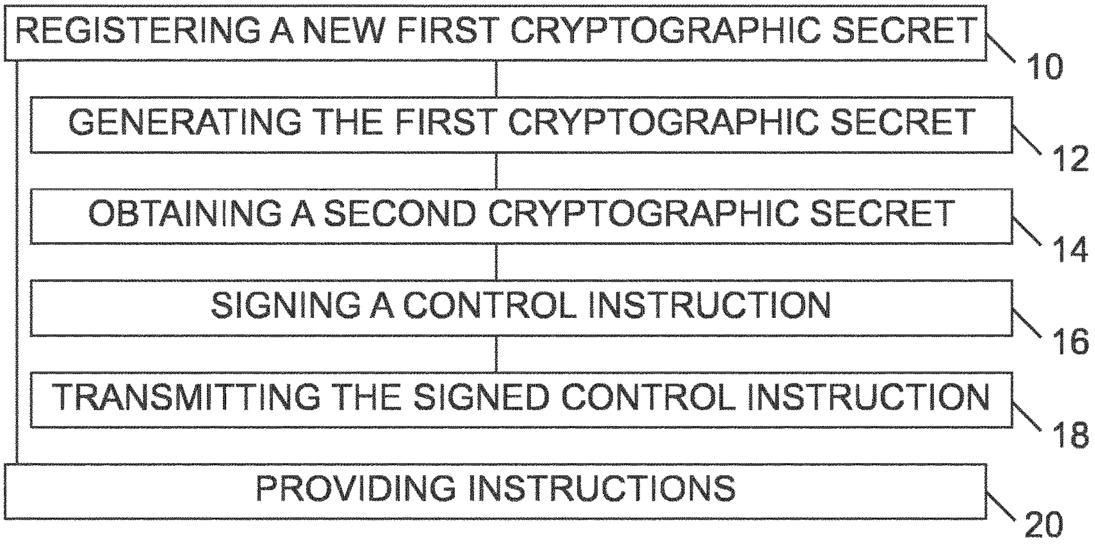
FIG. 1*b* shows a flow chart of an example of a wallet control method.
Figure 1C:
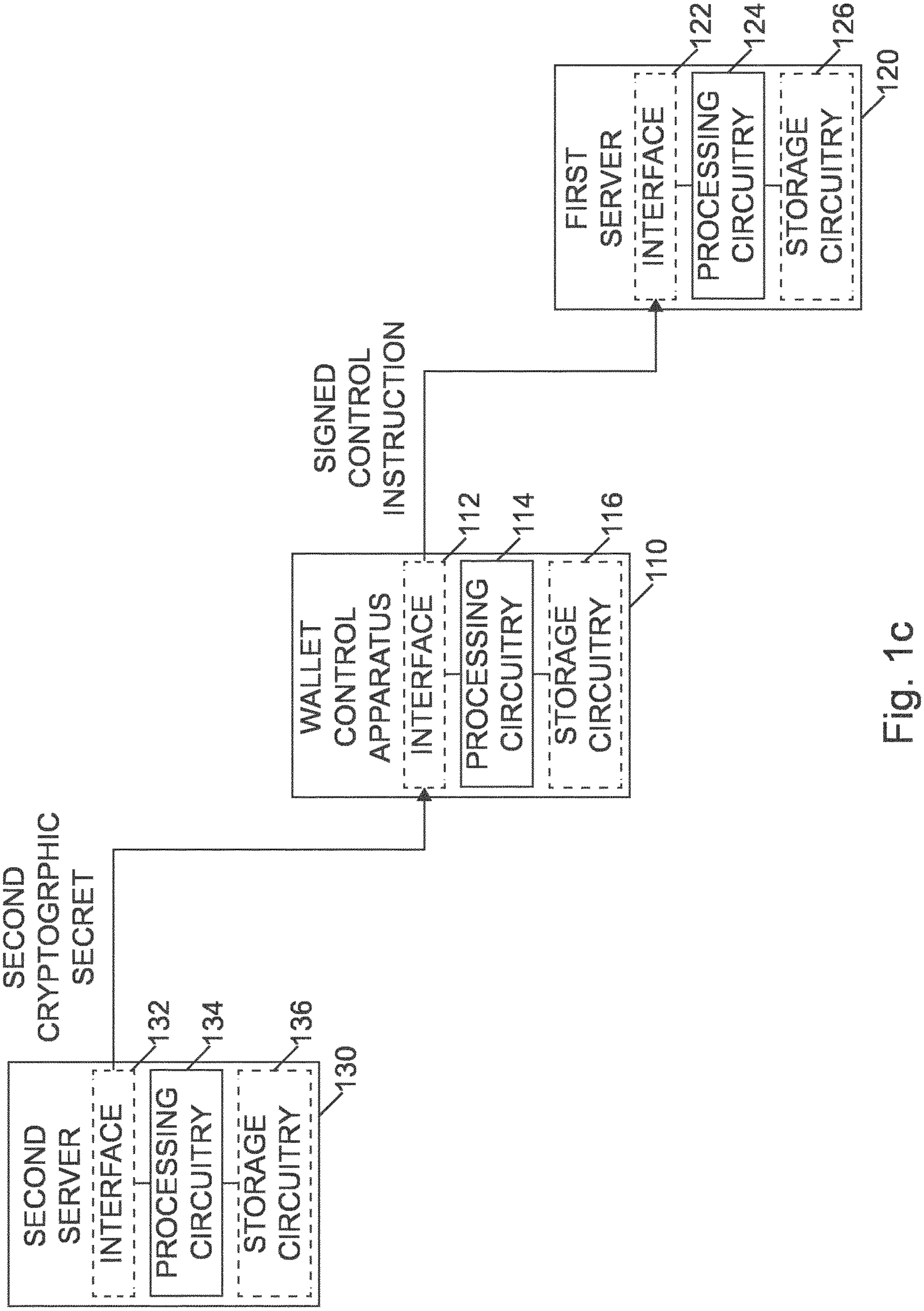
FIG. 1*c* shows a schematic diagram of an example of a system comprising a wallet control apparatus, a first remote server and a second remote server.

FIG. 1*b* shows a flow chart of an example of a corresponding wallet control method. The method comprises registering 10 a new first cryptographic secret at a cryptocurrency wallet hosted in a trusted execution environment on a first remote server. Registering the new first cryptographic secret comprises generating 12 the first cryptographic secret. Registering the new first cryptographic secret comprises obtaining 14 a second cryptographic secret from the second remote server 130 (shown in FIG. 1*c*) upon authentication of an owner of the cryptocurrency wallet vis-à-vis the second remote server. Registering the new first cryptographic secret comprises signing 16 a control instruction for registering the first cryptographic secret at the cryptocurrency wallet using the second cryptographic secret. Registering the new first cryptographic secret comprises transmitting 18 the signed control instruction for registering the first cryptographic secret at the cryptocurrency wallet to the first remote server. The method comprises providing 20 instructions for controlling the cryptocurrency wallet to the first remote server, with the instructions being cryptographically protected based on the first cryptographic secret.

It is evident, that the wallet control apparatus, the wallet control method, and a corresponding wallet control computer program (e.g., wallet control application) interact with two other entities, namely the first remote server 120 and the second remote server 130. FIG. 1*c* shows a schematic diagram of an example of a system comprising the wallet control apparatus 110, the first remote server 120 and the second remote server 130. Similar to the computer system hosting the wallet control apparatus, the first remote server 120 and the second remote server 130 may be computer systems, comprising processing circuitry 124; 134 and, optionally, an interface 122; 132 and/or storage circuitry 126; 136. For example, the first remote server 120 comprises the processing circuitry 124, and optionally the interface 122 and/or the storage circuitry 126. The processing circuitry 124 shown in FIG. 1*c* is coupled with the optional interface 122 and the optional storage circuitry 126. For example, the processing circuitry 124 may be configured to provide the functionality of the first remote server 120 in conjunction with the interface 122 (for communicating with the wallet control apparatus 110 and/or the second remote server 130) and/or with the storage circuitry 126 (for storing and retrieving information). Similarly, the second remote server 130 comprises the processing circuitry 134, and optionally the interface 132 and/or the storage circuitry 136. The processing circuitry 134 shown in FIG. 1*c* is coupled with the optional interface 132 and the optional storage circuitry 136. For example, the processing circuitry 134 may be configured to provide the functionality of the second remote server 130 in conjunction with the interface 132 (for communicating with the wallet control apparatus 110 and/or the first remote server 120) and/or with the storage circuitry 136 (for storing and retrieving information).

The first remote server 120 and the second remote server 130 interact with the wallet control apparatus 110. For example, the storage circuitry 136 of the second remote server may be configured to store the second cryptographic secret. The processing circuitry 134 of the second remote server may be configured to provide the second cryptographic secret (to the wallet control apparatus 110) in response to authentication of the owner of the cryptocurrency wallet vis-à-vis the second remote server. On the other hand, the processing circuitry 124 of the first remote server 120 may be configured to provide the trusted execution environment, and to perform operations concerning the cryptocurrency wallet inside the trusted execution environment. In other words, the processing circuitry 124 of the first remote server 120 may be configured to host the cryptocurrency wallet inside the trusted execution environment.

In the following, a short introduction of the functionality of the wallet control apparatus, wallet control method, wallet control computer program and system are given with respect to the wallet control apparatus and system. Features introduced in connection with the wallet control apparatus and system may likewise be included in the corresponding wallet control method and wallet control computer program. This includes features performed by the first remote server and the second remote server. In other words, the wallet control method and wallet control computer program may likewise comprise features introduced in connection with the first remote server and/or the second remote server.

The proposed concept is directed at registering a new first cryptographic secret at a cryptocurrency wallet hosted in a trusted execution environment on the first remote server 120. Such a scenario may occur after initialization of the cryptocurrency wallet. For example, during initialization of the cryptocurrency wallet, the respective cryptographic secrets may be generated by the wallet control apparatus and be transmitted to the first remote server to be stored in the cryptocurrency wallet. After the cryptocurrency wallet is initialized, if the respective cryptographic are lost, e.g., due to loss or failure of device or due to incorrect operation of the wallet control apparatus or device, the proposed concept may be used to store a new first cryptographic secret in the wallet, e.g., replacing a previously used first cryptographic secret. For example, the processing circuitry of the wallet control apparatus may be configured to register the new first cryptographic secret after loss of a previously used first cryptographic secret.

In the proposed concept, the cryptocurrency wallet is stored in a trusted execution environment of the server. Accordingly, the wallet service apparatus is configured to provide, e.g., make available, control, or make accessible such a trusted execution environment. There are various implementations of trusted execution environments. A trusted execution environments may also be called a secure enclave, for example. In general, a trusted execution environment is an execution environment that is encapsulated from (i.e., shielded from) other processes being executed on the processing circuitry providing the trusted execution environment. In particular, processes being executed outside the particular trusted execution environment may be unable to read out, or write into, data or code being contained in the trusted execution environment. In the proposed concept, in particular, the contents of the wallet, and the wallet service application, might not be accessible from outside the trusted execution environment, e.g., except for an interface being used to update the wallet service application.

For example, the software code of the wallet service application being executed in the trusted execution environment may be audited by a third party. It may be updated using the above-referenced interface, which may be cryptographically protected. The contents of the wallet may remain shielded inside the trusted execution environment at any point.

In various examples of the present disclosure, public-private-key cryptography is used. In other words, a private key of a cryptographic key pair is used to sign something, e.g., an instruction, or a certificate of identity, and the corresponding public key can be used to verify the signature. On the other hand, the public key of the cryptographic key pair can be used to encrypt a piece of information, while the private key can be used to decrypt the piece of formation.

For example, both the first cryptographic secret and the second cryptographic secret may be keys of cryptographic key pairs. For example, the first cryptographic secret may be a private key of a device authorization key pair. In general, the device authorization key pair may be used for signing and verifying control instructions being issued by the wallet control apparatus for the wallet. The private key may reside with the wallet control apparatus and may be used to sign the control instructions, while the public key may be stored in the cryptocurrency wallet. Accordingly, the processing circuitry of the wallet control apparatus may be configured to generate the device authorization key pair with the private key and the public key. For example, the processing circuitry of the wallet control apparatus may be configured to derive a public key of the device authorization key pair from the private key of the device authorization key pair. The processing circuitry of the wallet control apparatus be configured to transmit the public key to the first remote server for storage in the cryptocurrency wallet. For example, the processing circuitry of the wallet control apparatus may be configured to include the public key of the device authorization key pair in the control instruction for registering the first cryptographic secret. In other words, the control instruction for registering the first cryptographic secret may comprise the public key of the device authorization key pair.

Similarly, the second cryptographic secret may be part of a cryptographic key pair as well. For example, the second cryptographic secret may be a private key of a device registration key pair. For example, the device registration key pair may be used for registering new device that are authorized to control the cryptocurrency wallet. The device registration key pair may be generated during initialization of the wallet, with the private key (i.e., the second cryptographic secret) being stored in the wallet control apparatus and by the second remote server, so that it can be restored if the device comprising the wallet control apparatus is lost or fails. A public key of the device registration key pair may be known to the cryptocurrency wallet (e.g., stored in the cryptocurrency wallet), so that it can be used by the first remote server (e.g., the cryptocurrency wallet) to verify the signed control instruction for registering the first cryptographic secret. For example, the second cryptographic secret may be received from the second remote server, e.g., after the owner of the cryptocurrency wallet has successfully authenticated themselves vis-à-vis the second remote server. This authentication may be performed by the wallet control apparatus, or without involving the wallet control apparatus. In particular, the owner may authenticate themselves in person at a company hosting the second remote server.

To register the new first cryptographic secret at the cryptocurrency wallet, a control instruction is generated, signed, and transmitted. In contrast to other instructions for controlling the wallet, this control instruction is not signed using the first cryptographic secret (e.g., the private key of the device authorization key pair), but using the second cryptographic secret (e.g., the private key of the device registration key pair), as the previously used first cryptographic secret (which is known to the cryptocurrency wallet) is lost. For example, the control instruction may instruct the cryptocurrency wallet to register the new first cryptographic secret (and in particular the public key of the new device authorization key pair) at the wallet. In addition, the control instruction may instruct the cryptocurrency wallet to remove the previously used first cryptographic secret (i.e., the public key of the previously used device authorization key pair) from the cryptocurrency wallet. Once the control instruction is generated and signed (using the second cryptographic secret/the private key of the device registration key pair), it is transmitted to the first remote server. In this context, the term signing means that the second cryptographic secret is used to generate a digital signature that is based on the control instruction (e.g., based on a hash value of the control instruction, including the public key of the device authorization key pair), and that can be used to verify that a) the control instruction has not been tampered with, and b) that the control instruction has been signed by an entity being in possession of the second cryptographic secret (and thus authorized to issue the control instruction).

At the first remote server, and in particular at the cryptocurrency wallet inside the trusted execution environment, the signed control instruction may be verified, and the public key of the device authorization key pair may be extracted from the control instruction and stored in the cryptocurrency wallet. For example, the processing circuitry of the first remote server may be configured to store the public key of the device registration key pair in the cryptocurrency wallet in the trusted execution environment, and to verify the signed control instruction for registering the first cryptographic secret based on the public key of the device registration key pair. The processing circuitry of the first remote server may be configured to extract the public key of the device authorization key pair from the signed control instruction. For example, the processing circuitry of the first remote server may be configured to store the public key of the device authorization key pair in the cryptocurrency wallet in the trusted execution environment, and to store the public key of the device authorization key pair in the cryptocurrency wallet.

If the registration of the new first cryptographic secret is successful, the first remote server may acknowledge the successful registration of the wallet control apparatus. For example, the processing circuitry of the wallet control apparatus may be configured to obtain a response from the first remote server in response to the signed control instruction for registering the first cryptographic secret at the cryptocurrency wallet. For example, the response may comprise a confirmation of the cryptocurrency wallet if the private key of the device registration key pair matches the public key of the device registration key pair stored in the cryptocurrency wallet, i.e., if the control instruction that is signed by the private key of the device registration key pair could be verified using the public key of the device registration key pair stored inside the cryptocurrency wallet. Accordingly, the processing circuitry of the first remote server may be configured to provide the response to the wallet control apparatus upon verification of the signed control instruction.

Once the new first cryptographic secret is installed at the wallet, it can be used to sign subsequent instructions for controlling the cryptocurrency wallet. The processing circuitry of the wallet control apparatus is configured to provide (subsequent) instructions for controlling the cryptocurrency wallet to the first remote server, with the instructions being cryptographically protected based on the first cryptographic secret. For example, the instructions may be cryptographically signed using the new first cryptographic secret, e.g., the private key of the device authorization key pair).

A more detailed introduction of the (optional) features and functionality of the wallet control apparatus, wallet control method, wallet control computer program and system will subsequently be given in connection with FIGS. 2 to 12. In FIGS. 2 to 12, the wallet control apparatus is denoted “Wallet App” 252 (in FIG. 2, 9-10) or “Crypto Wallet” (in FIGS. 6-8). It may be comprised in a mobile device 250 (shown in FIGS. 2 and 10) or a personal computer 1010 (shown in FIG. 10). The first remote server is denoted “Wallet Support Service”, and the second remote server is denoted “Vault Service”.

The interface 112; 122; 132 of the wallet control apparatus 110, of the first remote server 120 and/or the second remote server 130 may correspond to one or more inputs and/or outputs for receiving and/or transmitting information, which may be in digital (bit) values according to a specified code, within a module, between modules or between modules of different entities. For example, the interface 112; 122; 132 of the wallet control apparatus 110, of the first remote server 120 and/or the second remote server 130 may comprise interface circuitry configured to receive and/or transmit information.

For example, the processing circuitry 114; 124; 134 of the wallet control apparatus 110, of the first remote server 120 and/or the second remote server 130 may be implemented using one or more processing units, one or more processing devices, any means for processing, such as a processor, a computer or a programmable hardware component being operable with accordingly adapted software. In other words, the described function of the processing circuitry 114; 124; 134 of the wallet control apparatus 110, of the first remote server 120 and/or the second remote server 130 may as well be implemented in software, which is then executed on one or more programmable hardware components. Such hardware components may comprise a general-purpose processor, a Digital Signal Processor (DSP), a micro-controller, etc. For example, at least the processing circuitry 124 of the first remote server may be suitable for, e.g., configured to, providing/provide a trusted execution environment, such as Intel Software Guard Extensions, AMD Platform Security Processor or Secure Encrypted Virtualization, ARM TrustZone or RISC-V MultiZone.

For example, the storage circuitry 116; 126; 136 of the wallet control apparatus 110, of the first remote server 120 and/or the second remote server 130 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the wallet control apparatus, first remote server, second remote server, system, method, and computer program are mentioned in connection with the proposed concept, or one or more examples described above or below (e.g., FIGS. 2 to 13). The wallet control apparatus, first remote server, second remote server, system, method, and computer program may comprise one or more additional optional features corresponding to one or more aspects of the proposed concept, or one or more examples described above or below.

In FIGS. 1*a* to 1*c*, a core functionality of a concept denoted "guarded (crypto) wallet" has been introduced. This wallet is a new wallet type, which may be suitable for the average, non-tech-savvy user who is not well organized. For example, it may be setup as a (paid) service that releases the user from worries about loss of keys. It may provide an easy, unsophisticated user experience, e.g., with a minimal user configuration for recovery. If possible, it may be implemented as a self-custodial wallet, while carrying a reduced security risk for (large scale) attacks.

The proposed concept comprises three components—the first remote server, which may be a cloud service that stores the wallet assets (private keys) using secure enclave technology (like Intel SGX) in such a way that the cloud provider cannot access the wallet assets. This makes the proposed concept self-custodial. The wallet may be operated by the users from a wallet control apparatus (the second component), which may be hosted by a mobile phone, from which signed wallet instructions are sent to the wallets in the cloud where the wallet instructions are executed.

Optionally, an external authentication infrastructure outside the control of the cloud service may be used for wallet access and/or recovery (e.g., for authenticating the owner of the cryptocurrency wallet vis-à-vis the second remote server, which is the third component). For example, an SSI (Self-Sovereign Identity) infrastructure may be used. For example, SSI keys may be used that the user has registered with a government authority and for which the user received verifiable credentials. Alternatively, other forms of authentication infrastructure may be used for access to government websites, banking services, etc. To verify the verifiable certificates used for authentication, the cloud service may configure trust anchors, ideally inside the enclave. These may be updated through software updates.

Figure 2:
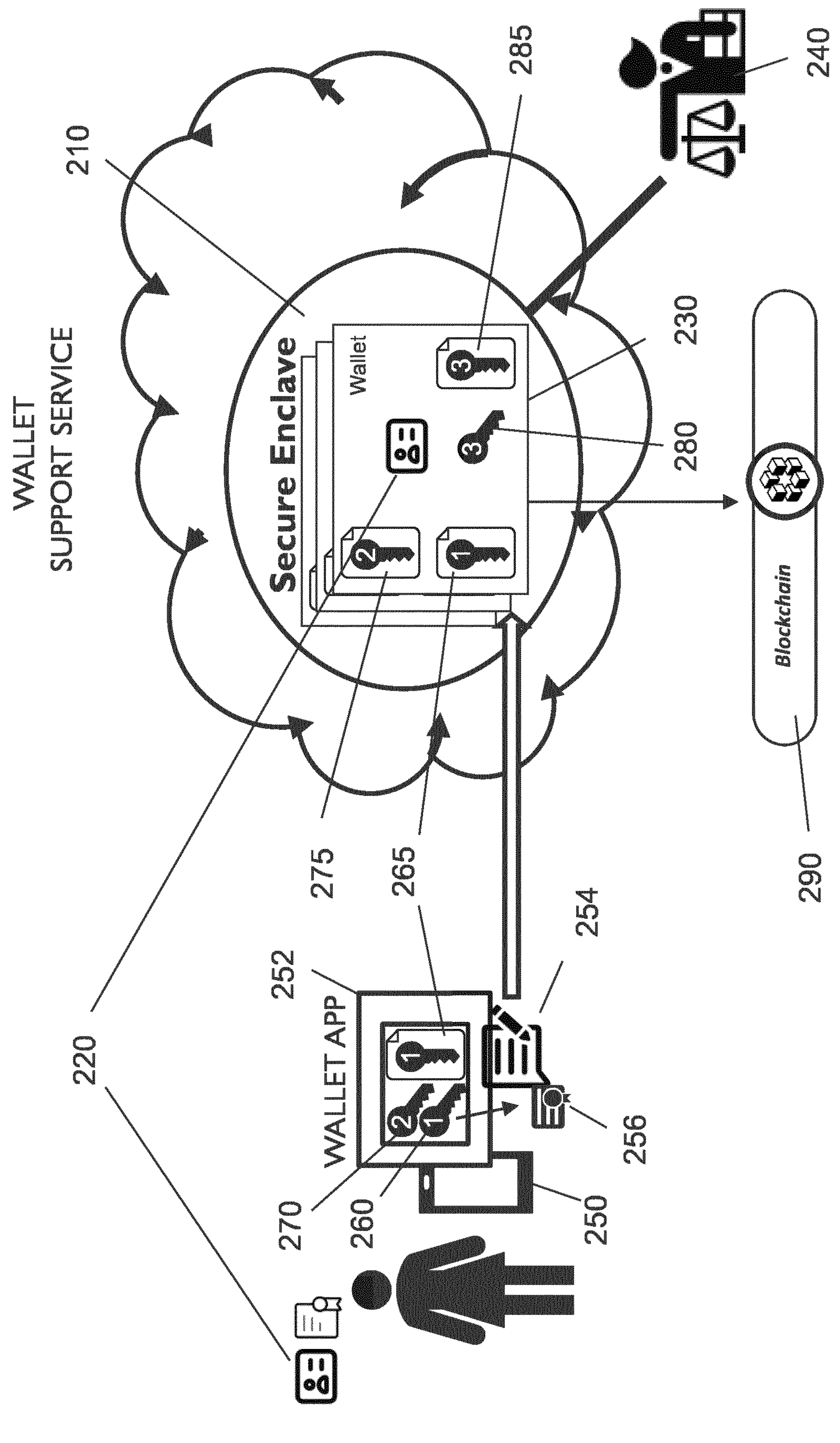
FIG. 2 shows a schematic diagram of a system comprising a wallet control apparatus and a first remote server hosting a cryptocurrency wallet.

FIG. 2 shows a schematic diagram of a system comprising a wallet control apparatus (Wallet App 252) and a first remote server hosting a cryptocurrency wallet 230. FIG. 2 shows the wallet support service with the secure enclave(s) 210 (the trusted execution environment). The secure enclave shields the cloud owner from the operations in the enclave (so that a self-custodial cryptocurrency wallet can be implemented). The enclave (or enclaves) may isolate small kernels of security sensitive code from the operating system and main software stacks. It may provide strong protection against attacks. Inside the secure enclave, individual user wallets 230 store the asset keys.

For reclaiming access to a wallet 230, the proposed concept may use a form of authentication that is renewable. For example, SSI certificates 220 handed out by government may be used for authentication. These certificates 220 can be held by the owner and stored in the wallet 230 inside the secure enclave 210. In this context, "renewable" means that the wallet owner can lose an authentication secret (e.g., a private key linked to an authentication certificate issued by a SSI run by a government agency), generate a new authentication secret, register it with the government agency, which will provide a new SSI certificate (signed identification certificate), signed by the government agency.

A challenge with the secure enclave is that the code may have to be upgraded regularly for new functionality and security and other (hot) fixes. For this, a mechanism may be used that forces the cloud provider to involve an independent auditing party 240 for any change applied to the code. The independent auditing party 240 may verify the sanity of the code running in the enclave and control the upgrading process of the code. In other words, software code running in the trusted execution environment may be audited by a third party. While this breaks the self-custodial character of the proposed concept somewhat, it should yield guarantees that wallet keys cannot be accessed by anybody involved in daily operations of the cloud service.

FIG. 2 shows a mobile device 250 of the owner with wallet app 252 (the wallet control apparatus). The wallet app 252 contains two private keys—private key 260 and public key 265 of a device authorization key pair and a private key 270 of a device registration key pair. The wallet app 252 uses the private key 260 of the device authorization kay pair to add a signature 256 to an instruction 254 for performing wallet operations. The wallet 230 comprises the public keys 265; 275 of the device authorization and device registration key pairs. The wallet 230 further comprises a private key 280 and a public key 285 of a wallet (blockchain) key pair for performing operations on the blockchain 290. In other words, the processing circuitry of the first remote server may be configured to store a third cryptographic secret (e.g., the wallet key pair, the private key of the wallet key pair, or a seed key of a hierarchical deterministic (HD) scheme used for generating the private keys for signing transactions on the blockchain) for signing transactions on a cryptocurrency blockchain 290 in the cryptocurrency wallet in the trusted execution environment. For example, the processing circuitry of the first remote server may be configured to sign the transactions on the cryptocurrency blockchain using the third cryptographic secret.

In general, the private key of the respective public/private key pairs may be used to sign messages, data structures etc. The public key of the respective public/private key pairs may be used when verifying whether a signature is created with the corresponding private key. To send crypto assets, the private key of the wallet key pair may be used for signing transactions on the cryptocurrency blockchain, with the private key of the wallet key pair being cryptographic code that functions as a secret password that allows the user to sign a cryptocurrency transaction and transfer funds to another cryptocurrency address.

Figure 3:
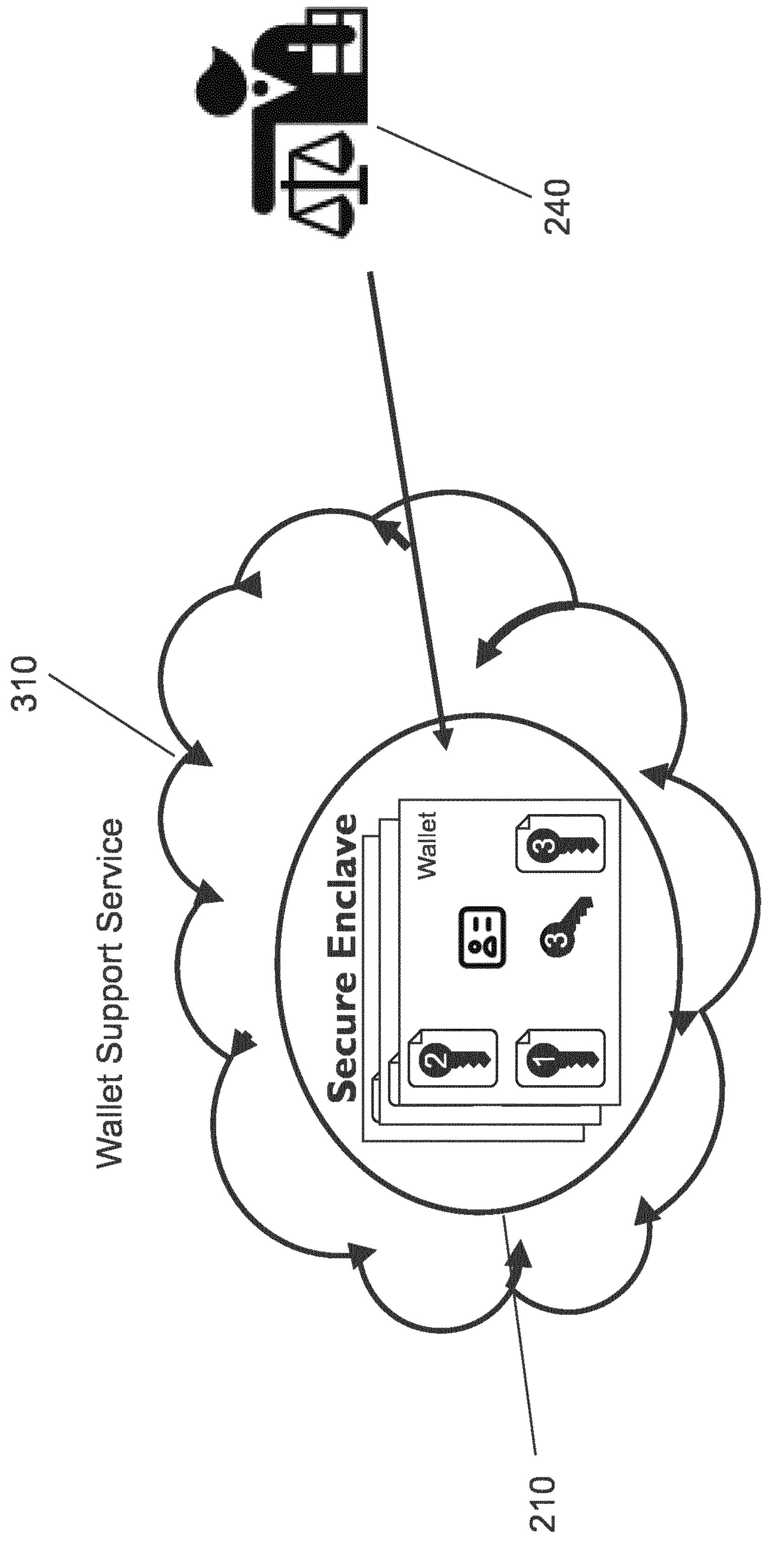
FIG. 3 shows a schematic diagram of a first remote server hosting a cryptocurrency wallet in a trusted execution environment.

In FIG. 3, the properties of the trusted execution environment (secure enclave) and content of the cryptocurrency wallet according to an example are shown in more detail. FIG. 3 shows a schematic diagram of a first remote server hosting a cryptocurrency wallet in a trusted execution environment (secure enclave) 310. In the following, the terms secure enclave and trusted execution environment are used interchangeably.

FIG. 3 shows the secure enclave 210 with the cryptocurrency wallet. In various examples, the wallet service operators cannot access the wallet keys (stored inside the secure enclave), cannot initiate any operation with a wallet key. Code running in the secure enclave is highly protected code, e.g., small kernels of code with only critical pieces of functionality. This may mitigate security risks caused by large software stacks with zero-day vulnerabilities.

The wallet support service 310 (provided by the first remote server) may be linked to natural persons with "bank level security" and renewable authentication (such as eID (electronic identification), bank card token, etc.).

The independent auditor 240 may review the code running in the enclave and confirm proper behavior and security. When a software update is due, the running code may hand over internal keys to the new version of the code, if that latter is signed by the auditing service. In addition, the independent auditor 240 may approve changes (in software updates) of trust anchors for identify certificate validation.

Figure 4:
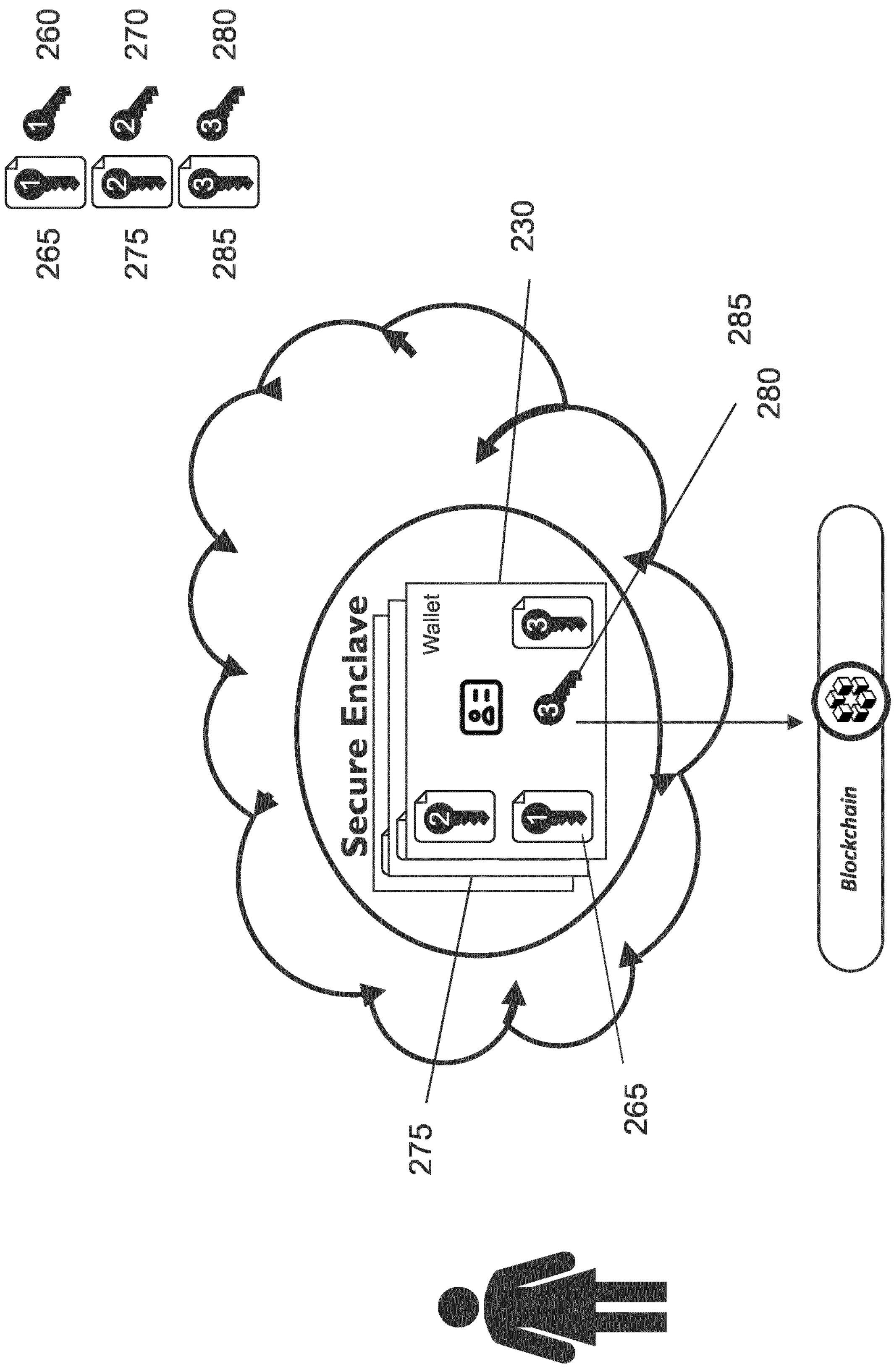
FIG. 4 shows a schematic diagram of contents of a cryptocurrency wallet hosted by a first remote server.

FIG. 4 shows a schematic diagram of contents of an example of a cryptocurrency wallet hosted by the first remote server. The proposed concept may aim to create a self-custodial wallet that is hosted by a wallet support service. Therefore, each wallet may be associated with a single user (a wallet per use). The cryptocurrency wallet may comprise the device authorization public key 265. A party that holds the corresponding private key 260 can issue operations on the assets in this wallet. The cryptocurrency wallet may comprise the device registration public key 275. A party that holds the corresponding private key 270 can register/unregister devices that can control this wallet. The cryptocurrency wallet may comprise the wallet key pair 280; 285 generated by the wallet service at user wallet creation time. The private key of the wallet key pair controls the assets associated with the wallet (by signing blockchain operations).

Figure 5:
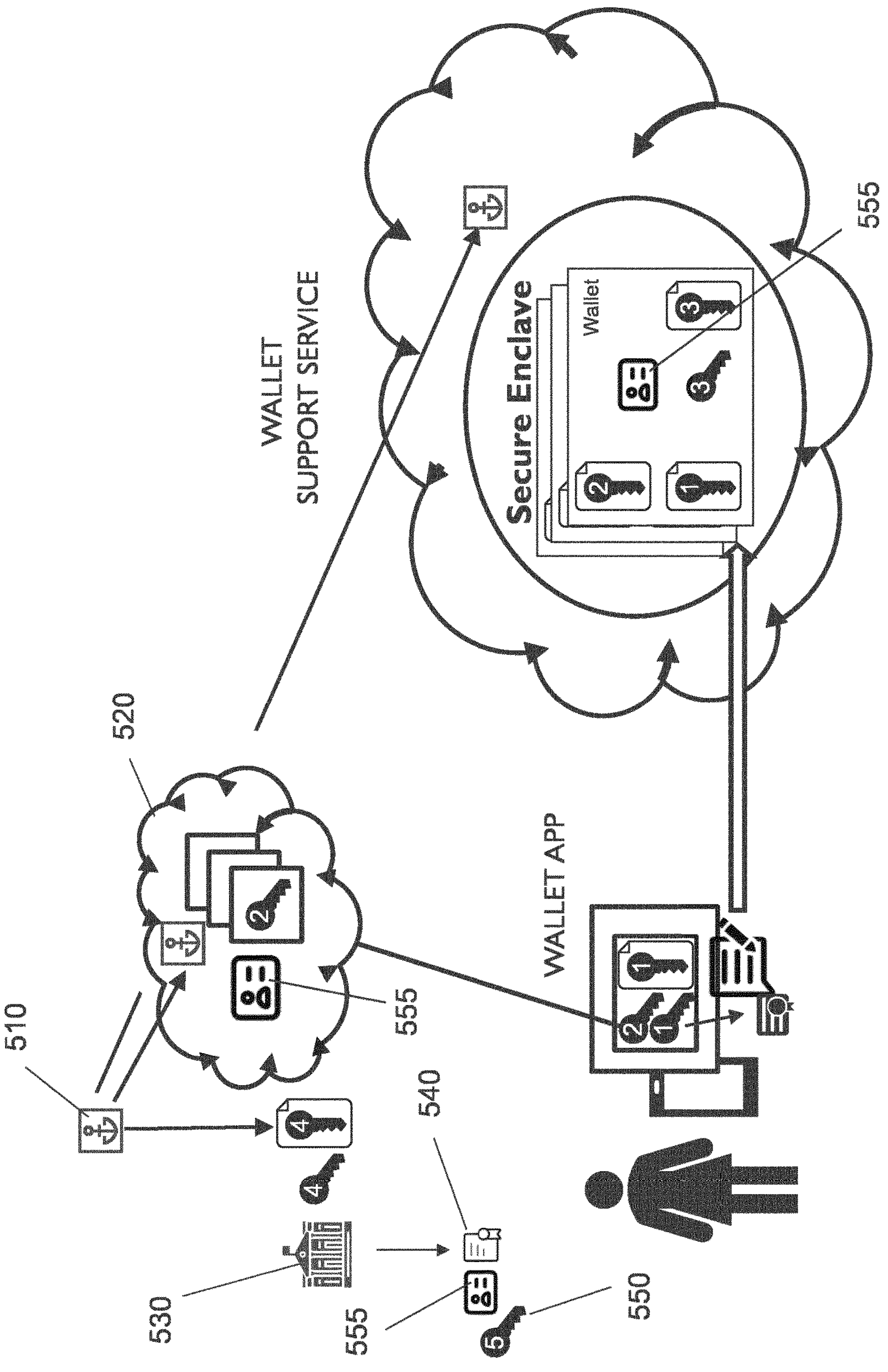
FIG. 5 shows a schematic diagram of a system comprising a wallet control apparatus, a first remote server hosting a cryptocurrency wallet, and a second remote server providing a vault service.

In the following, the use of the vault service (i.e., the second remote server) for recovering the second cryptographic secret is shown. FIG. 5 shows a schematic diagram of a system comprising the wallet control apparatus, the first remote server hosting the cryptocurrency wallet, and the second remote server providing the vault service.

The proposed concept is based on using an independent vault service for recovering the second cryptographic secret (i.e., the private key of the device registration key pair). To obtain the second cryptographic secret from the vault service, the owner of the cryptocurrency wallet needs to authenticate vis-à-vis the vault service, and, optionally, vis-à-vis the first remote server (as additional security measure for transmitting the signed control instruction for registering the new first cryptographic secret). A main purpose of the authentication may be to avoid that the vault service can access the wallet without involving the user.

Selecting the independent vault service(s) that the user wants to work with can be part of the onboarding process. The wallet support service can also verify that the vault service(s) have received the recovery key, releasing the user from any worry about wallet recovery.

In FIG. 5, a trust anchor 510 is introduced, which may be the anchor of trust with respect to the authentication of the wallet owner vis-à-vis the two remote servers. In particular, it may be used for wallet recovery. For example, the first and second remote server may both use the trust anchor to verify the identity (e.g., a signed identification certificate) of the owner of the cryptocurrency wallet. For example, the processing circuitry of the first remote server may be configured to store a public key of the trust anchor and to store information on an identity 555 of the owner of the cryptocurrency wallet in the wallet in the trusted execution environment. Similarly, the processing circuitry of the second remote server may be configured to store a public key of the trust anchor and to store information on an identity 555 of the owner of the cryptocurrency wallet. The Independent vault service 520 (of user's choice) stores credentials 555 that allow the user to reclaim access to their wallet.

In the wallet support service, the trust anchor(s) (and authentication) can be stored and performed outside the secure enclave. This might not make the solution custodial, because the recovery key (of the device registration key pair) is needed to reclaim the wallet which the wallet support service has no access to.

In FIG. 5, the trust anchor 510 is used by a government ID (identification) issuing agency 530 (which may support SSI), which may provide an ID certificate (identification certificate) 540 (with a user public key), with the ID certificate being signed by the agency, and a private key 550 that signs authentication requests. The wallet owner's national ID number 555 is stored in independent vault service 520 and in the wallet (at wallet creation time). Authentication requests signed by the wallet owner and accompanied with the ID certificate (or SSI proof of it) can be verified against the trust anchor(s).

Many variations are now possible for the authentication scheme (used for wallet recovery). For example, the processing circuitry of the wallet control apparatus may be configured to authenticate the owner of the cryptocurrency wallet vis-à-vis the second remote server by providing a signed identification certificate (the government agency-signed ID certificate 540) to the second remote server. For example, the signed identification certificate may be signed by an independent entity (e.g., the entity controlling the trust anchor), such as a government agency. The processing circuitry of the wallet control apparatus may be configured to obtain the second cryptographic secret in response to the authentication. For example, the signed identification certificate may be provided to verify an instruction that is signed with a private key 550 linked with the identification certificate 540 (and providing the signed identification certificate to verify the signature). In other words, the processing circuitry of the wallet control apparatus may be configured to authenticate the owner of the cryptocurrency wallet vis-à-vis the second remote server by signing an instruction with a private key linked with the identification certificate, so the signed instruction can be verified using the signed identification certificate. The wallet control apparatus may receive the signed identification certificate from the independent entity. For example, the processing circuitry of the wallet control apparatus (and the respective processing circuitry of the first and second remote server) may be configured to obtain the signed identification certificate from the independent entity.

For example, the authentication that is based on the signed identification certificate may be similar to authentication performed according to Transport Layer Security (TLS). TLS a cryptographic protocol that is used to provide communication security for communications that occur over a computer network, e.g., between a web server and a web browser. In TLS, the server provides an identification certificate to the client, comprising the name of the server, a reference to the trusted certificate authority (CA) that vouches for the authenticity of the certificate, and the public key of the server. The client uses the public key of the server to encrypt a first encrypted message comprising a random number, which the server can decrypt using its private key. The random number can now be used for encryption of a Diffie-Hellman key exchange, which results in a session key that is used for the subsequent communication. As mentioned above, the identification certificate provided by the server comprises a reference to the trusted CA that vouches for the authenticity of the certificate. Thus, a certificate chain is formed from the identification certificate to the trusted CA. In many cases, the CA being referenced is not a root CA, but an intermediate CA. Therefore, to verify the authenticity of the certificate, the client follows the certificate chain to the intermediate CA, which also provides a similar identification certificate, which may include a reference to a further intermediate CA or to the root CA. Thus, the certificate chain is extended to the further intermediate CA or to the root CA. Once the certificate chain arrives at the root CA, the certificate chain is complete. The CAs are typically organized in a hierarchical tree structure, which all link back to the root CA at the top of the tree. The public key associated with the signing key of the root CA is called the trust anchor. The trust anchor is typically hard coded in entities that need to authenticate another party, which is why it is called a trust anchor. For example, the public key of the root CA may be stored in a "trusted root CAs" store of the client and serve as the trust anchor of the verification procedure. The client may traverse the certificate chain to the root CA verify the authenticity of the identification certificate.

In the proposed concept, a similar scheme may be used, wherein the wallet control apparatus takes the role of the server (of the TLS scheme) and the first (or second) remote server takes the role of the client (of the TLS scheme). For example, the wallet control apparatus may generate or obtain a public/private key pair of the owner of the wallet, of which the public key is then registered with the government agency associated with the trust anchor being used. The government agency may sign the public key registered at the government agency and generate the identification certificate thereupon (with the public key of the owner and an identifier, e.g., passport number, identifying the owner, and a reference to the trust anchor). The first and second remote server may now use the signed identification certificate, which is vouched for by the trust anchor, to verify that instructions issued by the wallet control apparatus are issued by the owner of the identification certificate. SSI is a more modern adaptation of this scheme, which makes use of blockchain technology.

In cases where the authentication is performed by the control apparatus, the second remote server may automatically verify the signed identification certificate. For example, the processing circuitry of the second remote server is configured to obtain the signed identification certificate from the wallet control apparatus. As outlined above, the signature of the signed identification certificate may be derived from the trust anchor. In this case, the processing circuitry of the second remote server may be configured to verify the signed identification certificate based on a public key of the trust anchor (and based on the stored credentials 555 of the wallet owner). The processing circuitry of the second remote server may be configured to authenticate the owner vis-à-vis the second remote server based on the signed identification certificate of the owner and based on information on an identity of the owner of the cryptocurrency wallet (e.g., the credentials/ID number of the wallet owner 555) stored on the second remote server.

Some variations can involve human procedures. For example, the wallet owner may come into the office of the wallet support service to identify themselves. Accordingly, the authentication of the owner of the cryptocurrency wallet vis-à-vis the second remote server may be performed outside the wallet control apparatus. For example, the processing circuitry of the second remote server may be configured to obtain the signed identification certificate from another entity separate from the wallet control apparatus. Alternatively, the verification of the authentication may be performed manually by an operator of the second remote server.

Figure 6:
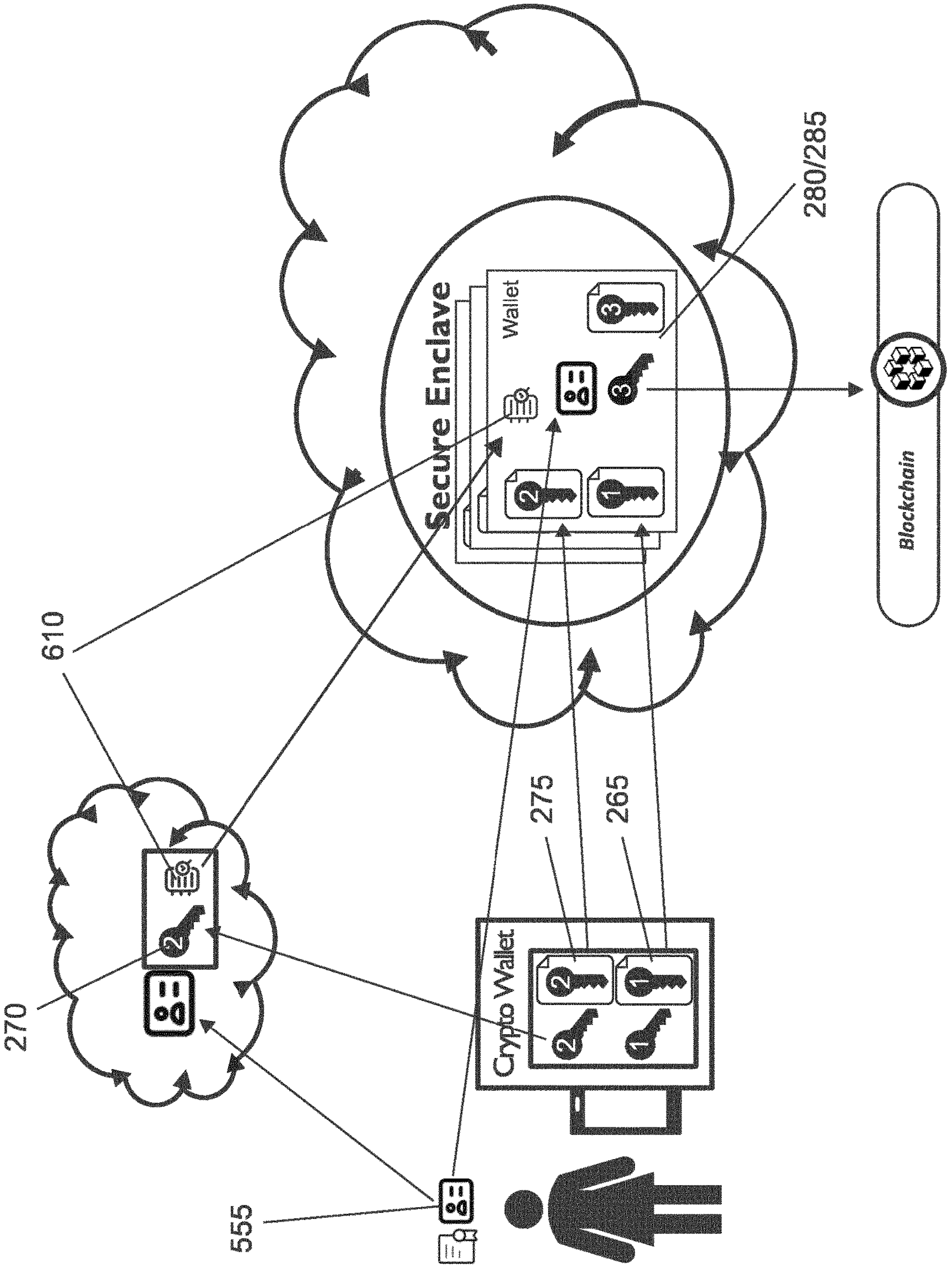
FIG. 6 illustrates a creation of a cryptocurrency wallet hosted in a trusted execution environment of a first remote server.

In the following, the creation of the cryptocurrency wallet in the cloud is discussed. FIG. 6 illustrates a creation of a cryptocurrency wallet hosted in a trusted execution environment of the first remote server. As shown in FIG. 2, the crypto wallet (wallet control apparatus) of the user on their mobile device comprises the device registration private key 270 and device authorization private key 260 that may be generated in the Crypto Wallet/App of user. The device registration public key 275 and device authorization public key 265 may be derived from the respective private keys and transferred and stored in the wallet on the wallet support service. The device registration public key 275 stored in the wallet allows the user to get access to this wallet by registering one of their devices. The device authorization public key 265 allows the user to initiate an operation on an asset in the wallet. The wallet key pair 280; 285 with which blockchain operations are performed are also stored in the wallet. It can be generated in the wallet on the user device or in the cloud wallet. The device registration private key 270 (i.e., the second cryptographic secret) is further stored in the independent vault service. This allows the user to recover the device registration key.

The user's credentials 555 are stored in the cloud wallet and in the independent vault service. This allows the user to always identify themselves (also after renewing identity credentials). Existing banking-standards level security renewable authentication (e.g., using an SSI proof of identity) may be used to authenticate the user vis-à-vis the independent vault service and the cloud wallet support service. Authentication on the cloud wallet service may be done outside the secure enclave (as verifiable credential-based authentication inside the enclave requires reliable and up to date trust anchors, which may be difficult and represent a single point of failure.)

A proof 610 that the user has vaulted a copy of the registration key (=recovery key) at the independent vault service may be transferred from the independent vault service to the cloud wallet (and stored inside the wallet). In other words, the second remote server may be configured to provide confirmation information on the second cryptographic secret being stored by the second remote server to the first remote server. For example, the confirmation information may include information on the identity of the owner of the cryptocurrency wallet.

After the respective cryptographic keys and pieces of information have been stored in the respective entities, the wallet may be declared as initialized and ready for use. At this point the wallet service may guarantee that the user can always regain access to this wallet.

Figure 7:
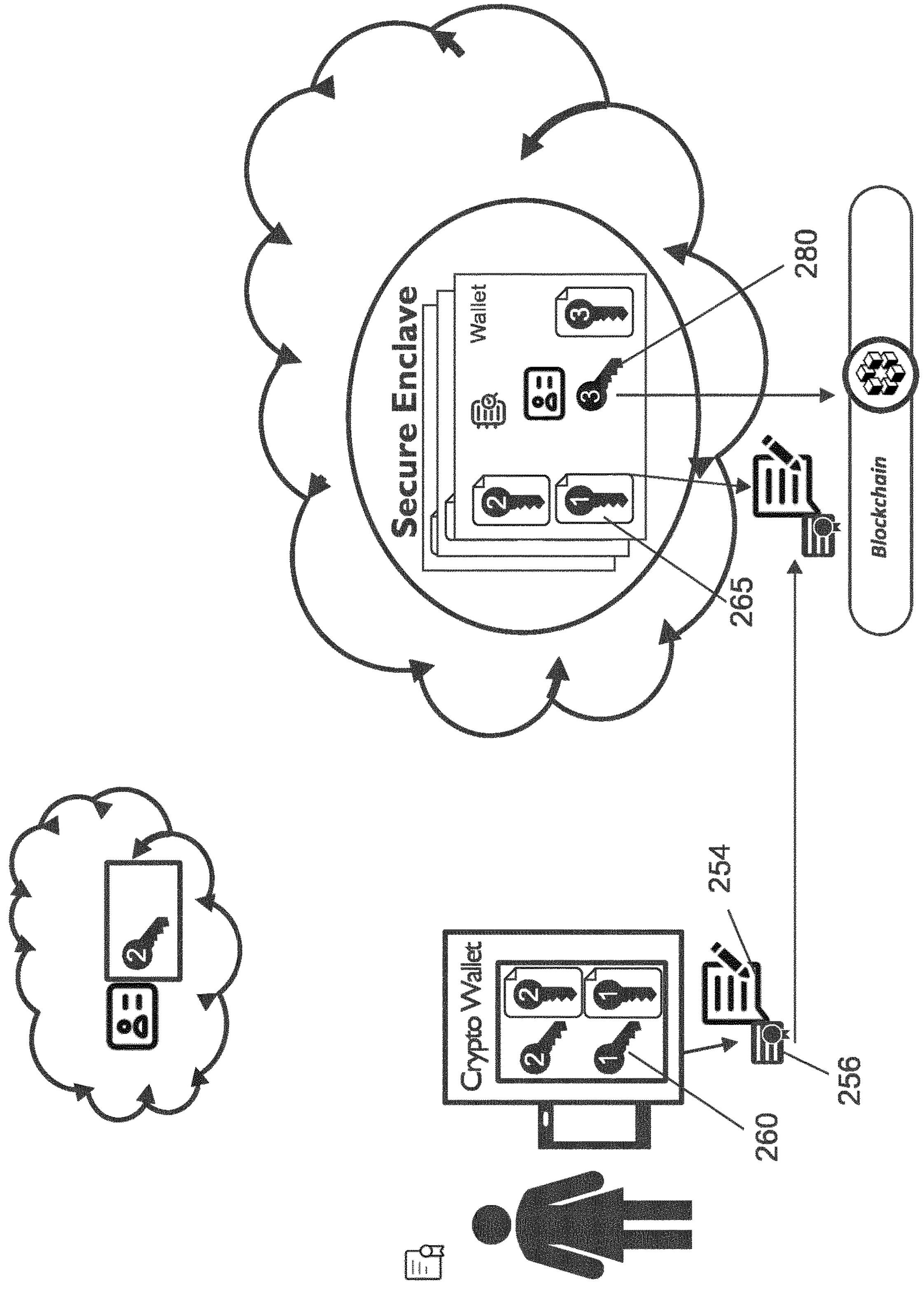
FIG. 7 illustrates how operations are performed on a cryptocurrency wallet hosted in a trusted execution environment of a first remote server.

FIG. 7 illustrates how operations are performed on a cryptocurrency wallet hosted in a trusted execution environment of the first remote server (i.e., the cloud wallet support service). Instructions 254 to perform a wallet operation are signed 256 with the device authorization key 260 (i.e., the first cryptographic secret) and transmitted to the cloud wallet. At the cloud wallet, the device authorization public key 265 is used to verify the signature. The blockchain private key 280 is used to perform the blockchain operation.

In case the crypto wallet/wallet app on the owner's device or crypto wallet app is lost (as the device is stolen, lost, or the app is removed, access to the cryptocurrency wallet can be restored.

Figure 8:
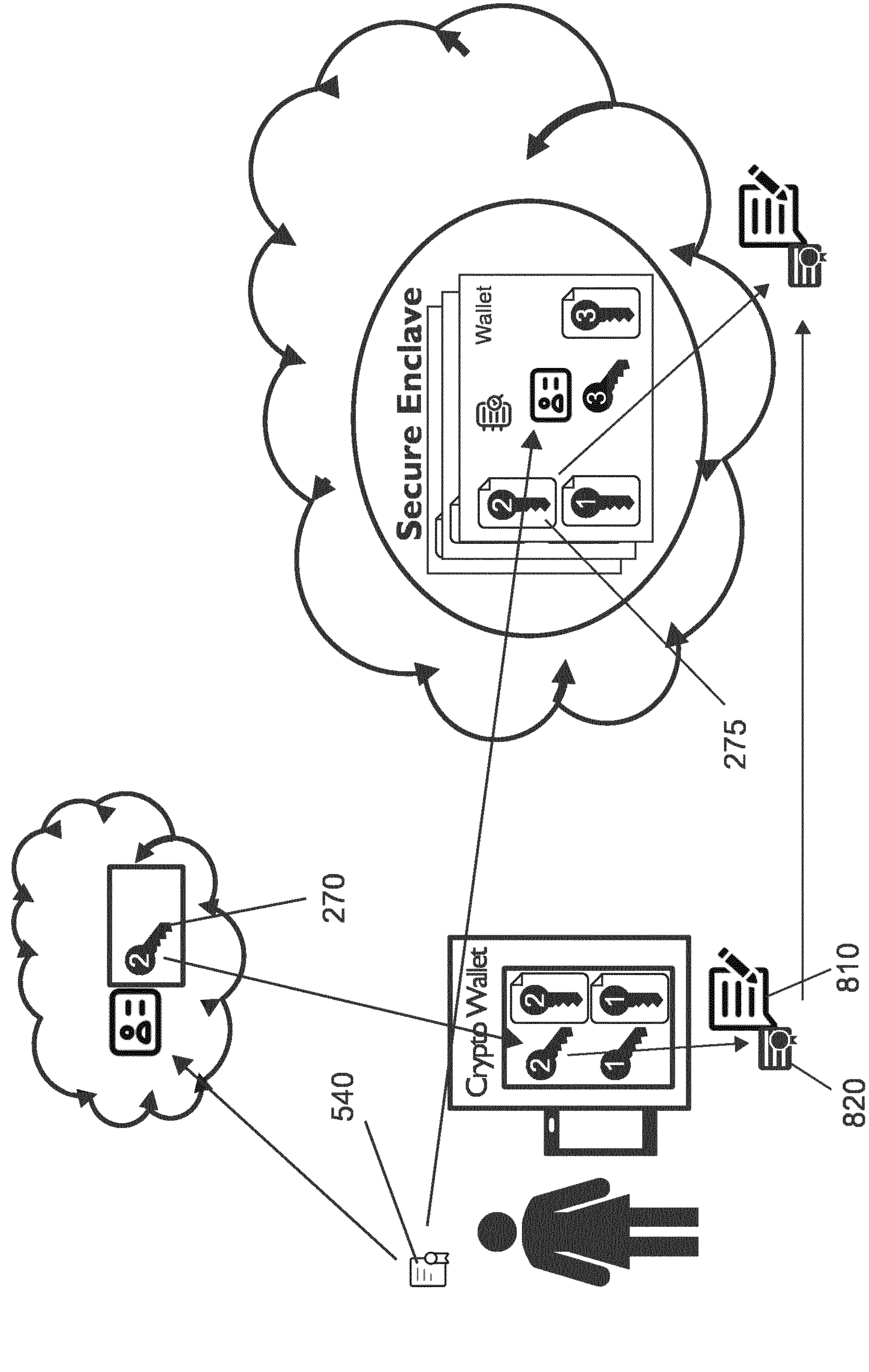
FIG. 8 illustrates how access to a cryptocurrency wallet hosted in a trusted execution environment of a first remote server is restored.

FIG. 8 illustrates how access to a cryptocurrency wallet hosted in a trusted execution environment of the first remote server is restored. During recovery, the wallet owner uses their ID cert 540 to authenticate vis-à-vis the independent vault service and the cloud wallet service. The backup of the private device registration key 270 (i.e., the second cryptographic secret) is retrieved from the independent vault service and stored in the crypto wallet on the owner's mobile device (i.e., the wallet control apparatus). A new device authorization key pair (i.e., the first cryptographic secret) is created, and an instruction 810 to remove the old device and register the new device is signed 820 with the device registration key 270 and transmitted to the cloud wallet service, where its signature is verified using the device registration public key 275. Accordingly, the control instruction for registering the first cryptographic secret at the cryptocurrency wallet may comprise a first instruction for removing a previously used first cryptographic secret from the cryptocurrency wallet and a second instruction for registering the new first cryptographic secret at the cryptocurrency wallet.

Figure 9:
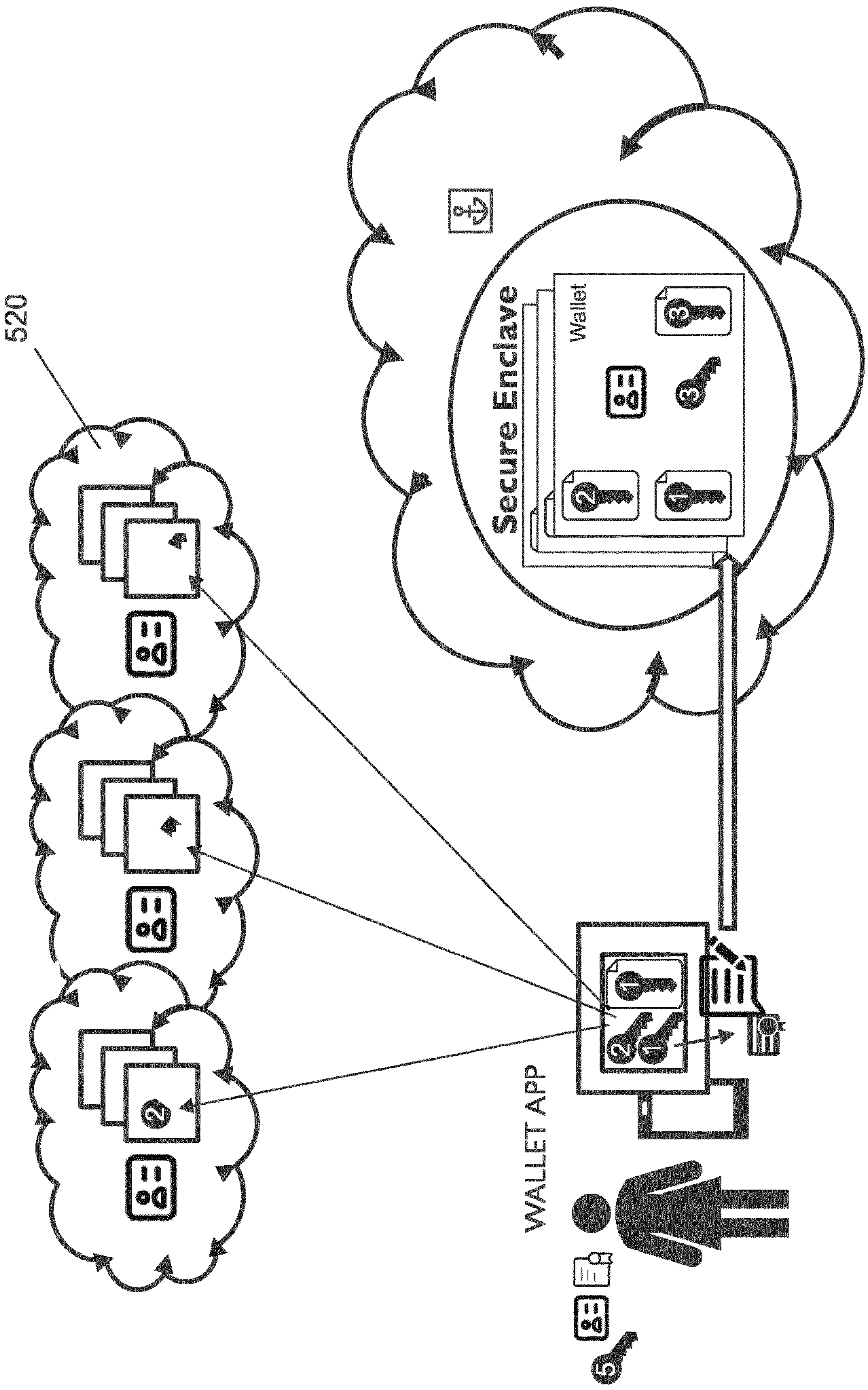
FIG. 9 illustrates the use of multiple second remote servers.

In some implementations, multiple vault services may be used. For example, the system may comprise two or more second remote servers. FIG. 9 illustrates the use of multiple second remote servers 520. For example, the processing circuitry of the wallet control apparatus may be configured to obtain the second cryptographic secret from the two or more second remote servers. In general, multiple second remote servers may be used for two purposes—to create redundancy, or to spread the private key of the device registration key pair (i.e., the second cryptographic secret) across multiple second remote servers.

For example, when multiple second remote servers are used for the purpose of redundancy, the processing circuitry of the wallet control apparatus is configured to select one of the two or more second remote servers, and to obtain the second cryptographic secret from the selected second remote server.

When the key is split over two or more (independent) vault services (as shown in FIG. 9), the wallet owner can reconstruct the wallet recovery key by retrieving parts of the key from m out of n vaults and combining them (e.g., using a Shamir secret sharing scheme). For example, the processing circuitry of the wallet control apparatus may be configured to obtain two or more parts of the second cryptographic secret from the two or more remote servers, and to combine the two or more parts to obtain the second cryptographic secret. For example, while the second cryptographic secret may be split into multiple parts, a scheme may be used that allows reconstructing the second cryptographic secret from a subset of the parts (e.g., the aforementioned Shamir secret sharing scheme).

Figure 10:
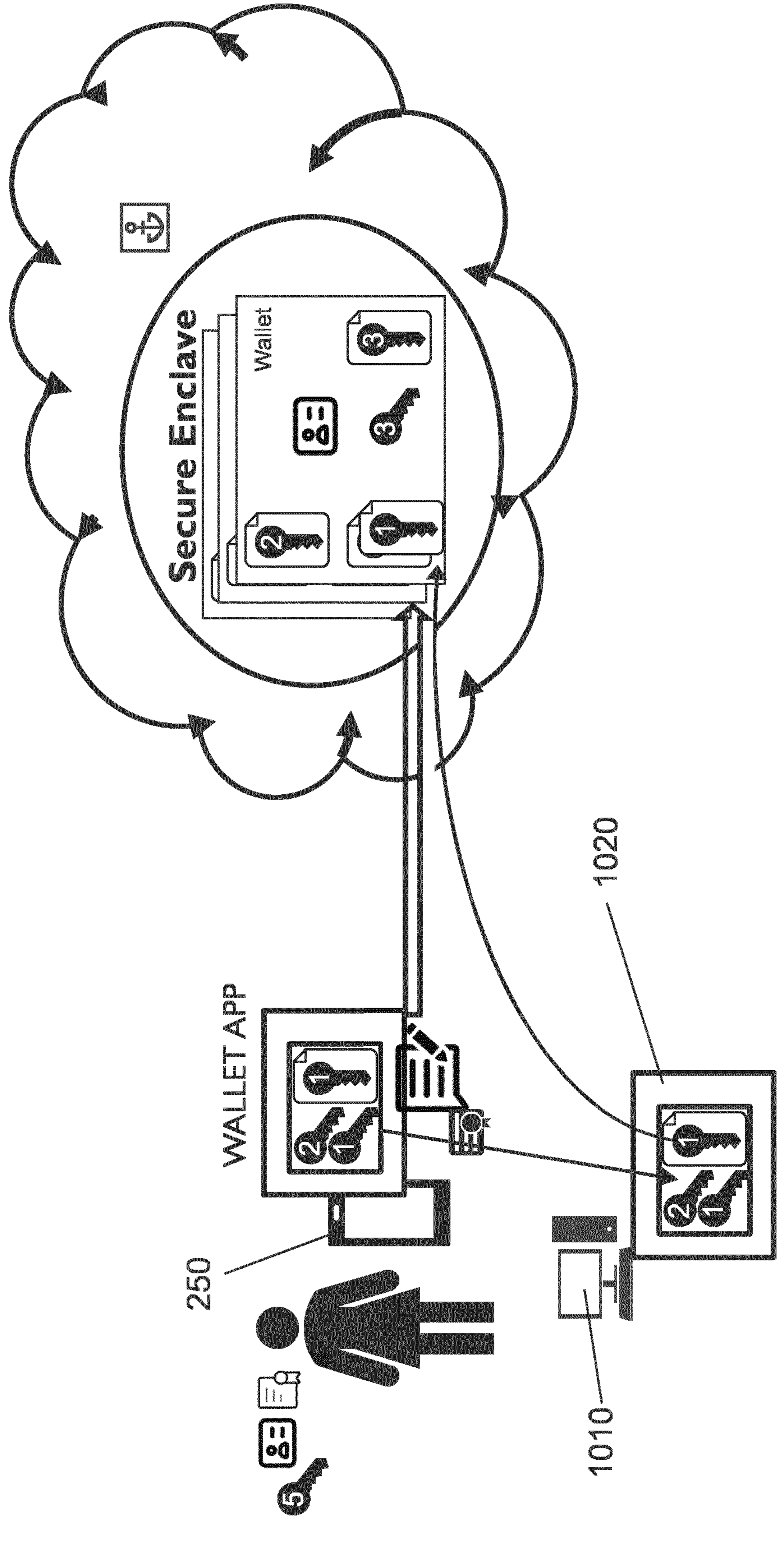
FIG. 10 how access to a cryptocurrency wallet hosted in a trusted execution environment of a first remote server is transferred to other devices of a wallet owner.

While the present disclosure relates to how access to the wallet can be recovered via a vault service, access can also be transferred to a new (or secondary) device without involving a vault service. FIG. 10 illustrates how access to a cryptocurrency wallet hosted in a trusted execution environment of the first remote server is transferred to other devices of the wallet owner.

In some cases, the owner can have multiple devices, such as a mobile device 250 and a computer 1010, which can also host a crypto wallet app 1020. From one of her devices, the wallet owner can request the wallet service to give access to a wallet on another of her devices. The original wallet app can send a signed request to the wallet support service which contains the public key (of the device authorization key pair) of the new wallet app. In this case, the previously used public key of the device authorization key pair is not removed but kept alongside the new public key.

Figure 11:
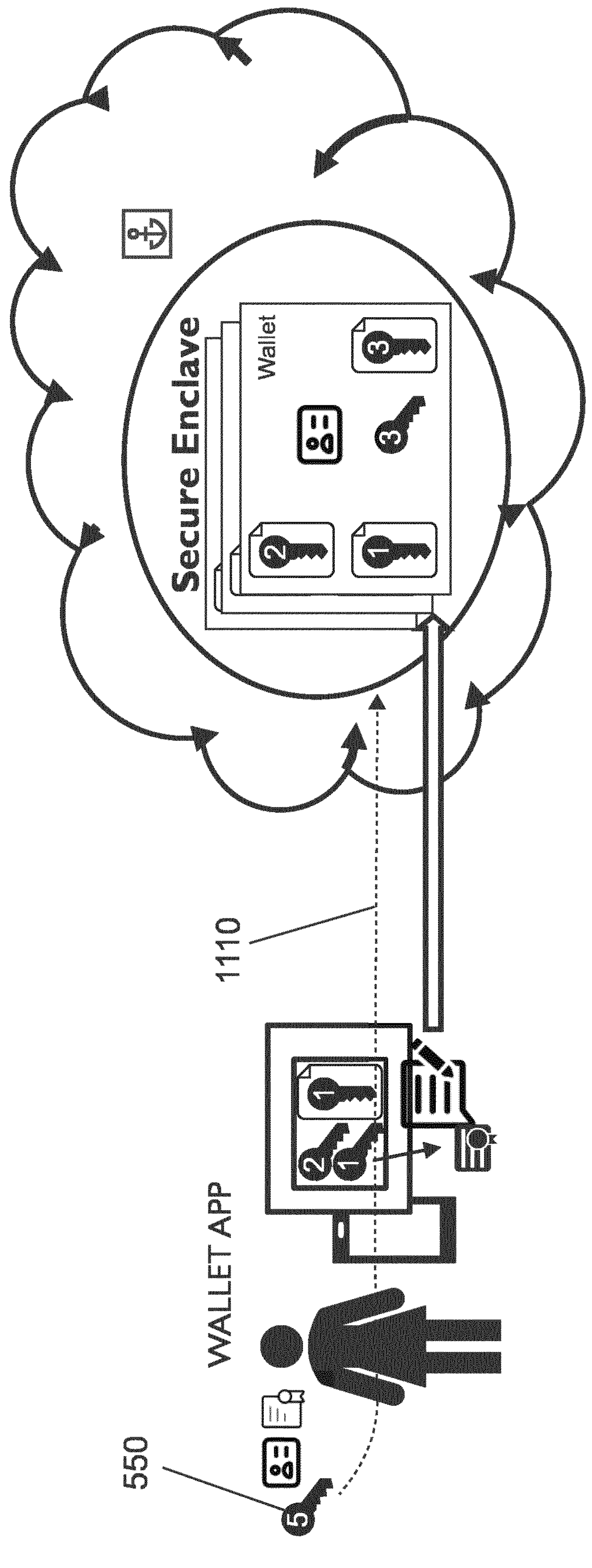
FIG. 11 illustrates how rate limits and other usage controls can be set in a cryptocurrency wallet hosted in a trusted execution environment of a first remote server.

The proposed guarded wallet may also provide more advanced features, such as rate limits and other usage controls. FIG. 11 illustrates how rate limits and other usage controls can be set in a cryptocurrency wallet hosted in a trusted execution environment of the first remote server. Rate limits (e.g., daily maximum amount for transactions) and other usage controls may be imposed (by the wallet), configurable by the user. Surpassing the configured restrictions may be allowed after authentication (e.g., via the private key 550 that signs authentication requests). For example, this authentication may be done outside the secure enclave.

For example, a subset of instructions for controlling the cryptocurrency wallet require inclusion of a signed identification certificate of the owner of the cryptocurrency wallet (e.g., the instructions may be signed using the private key 550 that signs the authentication requests). For example, the subset of instructions may comprise an instruction for setting a rate limit, an instruction for removing or changing a rate limit, an instruction for setting a usage control, an instruction for removing or changing a usage control, and the control instruction for registering the new first cryptographic secret. The processing circuitry of the wallet control apparatus may be is configured to include the signed identification certificate (e.g., sign the respective instructions with the private key 550 that signs the authentication requests) with the subset of instructions for controlling the cryptocurrency wallet. The processing circuitry of the first remote server may be configured to verify the subset of instructions based on the information on the signed identification certificate, based on the information on the identity of the owner of the cryptocurrency wallet (and based on the public key of the trust anchor).

Alternatively, multi-signature schemes could be used to protect large operations. In this case the wallet in the enclave would only proceed with a transaction if the request to perform the transaction is signed by multiple parties. A party can be another person, or another device of the wallet owner.

With respect to wallet removal, it may be a choice (or user option) that the wallet can never be removed without first being emptied (assets transferred to another wallet).

Figure 12:
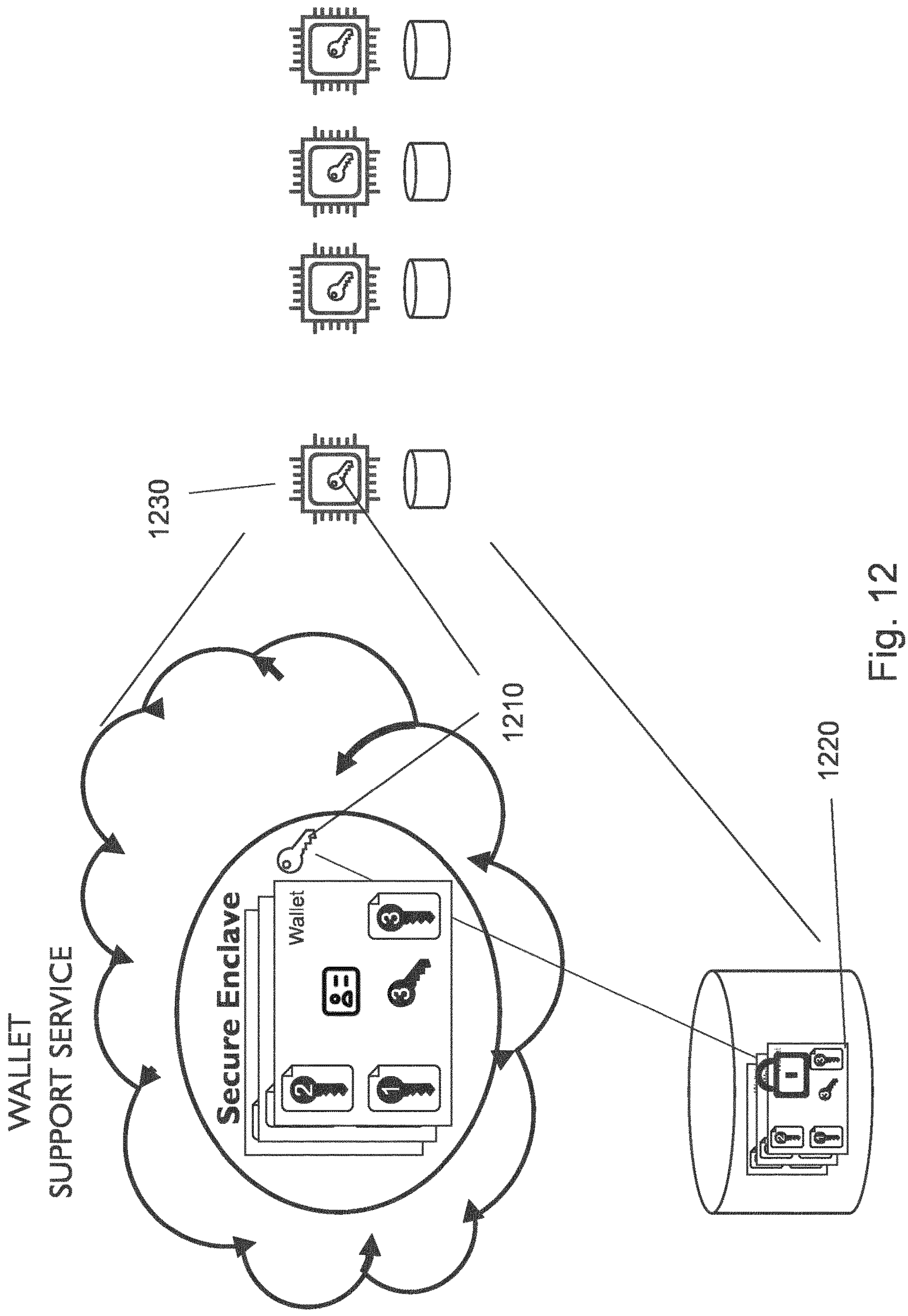
FIG. 12 how a cryptocurrency wallet hosted in a trusted execution environment of a first remote server can be protected via persistent storage and redundancy.

In the following, some details are given on techniques for protecting the wallet(s) stored in the secure enclave(s) of the first remote server. FIG. 12 illustrates how a cryptocurrency wallet hosted in a trusted execution environment of a first remote server can be protected via persistent storage and redundancy. For the deployment of a cloud wallet service, security and back-up are crucial. For this, a "banking standards security level" may be applied.

For example, the wallet assets may be encrypted and backed up to permanent storage. FIG. 12 shows how encrypted copies 1220 of wallet assets are persisted in permanent storage (e.g., the storage circuitry 126 of the first remote server). Only the enclave(s) can decrypt (with a global wallet encryption key 1210). The wallet support service may be provided by secure hardware 1230 (e.g., the processing circuitry 124 of the first remote server) with embedded encryption keys 120 that support secure enclave technology (like Intel SGX). Redundancy may be created by replicating both the hardware (with keys) and the persistent storage with the wallet assets.

The proposed concept may support emergency measures for the (highly unlikely) case when all CPU (Central Processing Unit) hardware that contain the global wallet encryption key has become unavailable or broken. In this emergency situation all data on backups become inaccessible.

Figure 13:
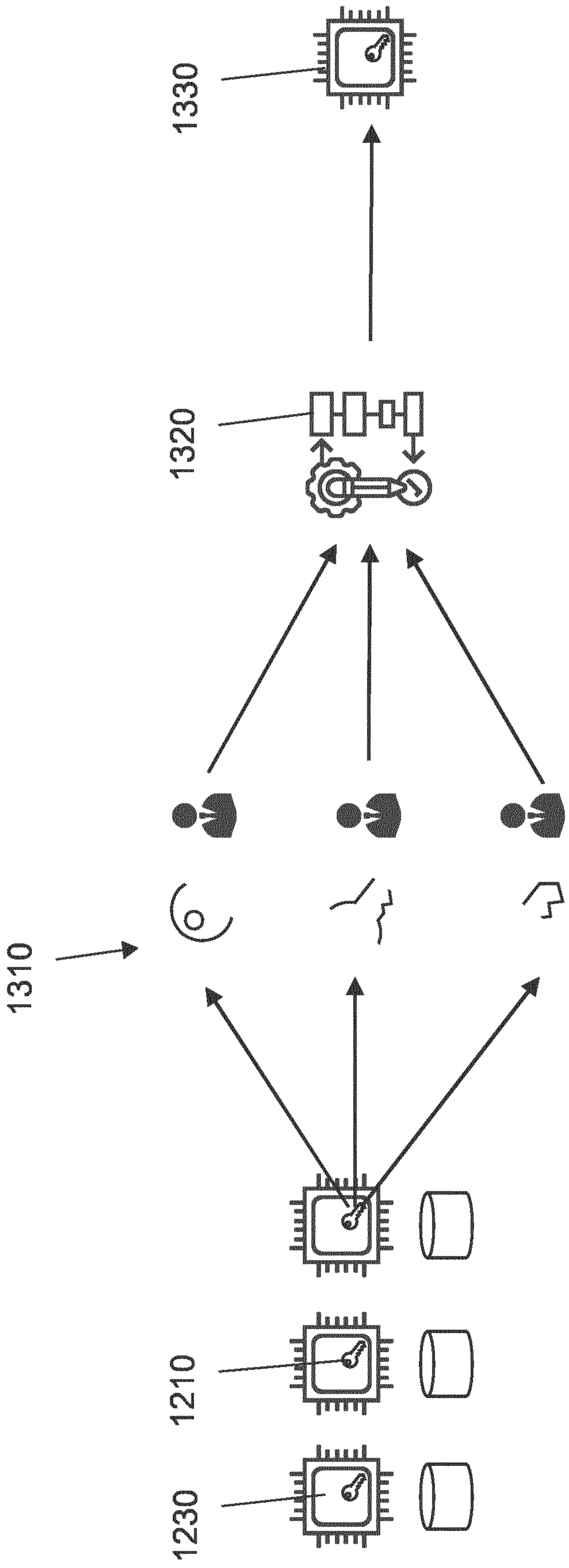
FIG. 13 illustrates emergency measures that can be taken for recovering a cryptocurrency wallet hosted in a trusted execution environment of a first remote server.

FIG. 13 illustrates emergency measures that can be taken for recovering a cryptocurrency wallet hosted in a trusted execution environment of the first remote server. For example, the global encryption key 1210 (giving access to all wallets) may be split into different parts 1310 (with e.g., Shamir secret sharing), which are handed over to different key people in the cloud service organization. Very strict procedures may control the situation in which these key parts can be combined 1320 in order to instantiate new enclaves 1330 with the reconstructed key. This reconstructed enclave can now again render the data on the backups accessible again and instantiate other enclaves and populate them with the global encryption key.

The proposed guard wallet concept may provide easy setup, resistance to human mistakes (and loss of assets), possibility to set usage controls (daily limits, confirmation for large transactions), a decentralized setup, decreased security risks (with respect to sensitivity to vulnerabilities, large scale attacks), and support for different types of assets, at the expense of anonymity.

In general, the proposed concept may be complex to deploy, in particular with respect to software updates to the secure enclaves. This may be ensured by configuring the secure enclaves (i.e., the software running in the secure enclaves) such, that the enclave accepts a software update when it is signed by the auditing party. While this may strengthen the security of the proposed concept, it may also delay procedures in case a quick patch (e.g., of a vulnerability) is required.

To avoid failure in identity certificates (e.g., when a (government) agency makes a mistake and hands out identity certificates to the wrong people), a combination of authentication methods may be used (possibly depending on the amount of value stored in the wallet). To avoid enclaves getting broken and keys being lost, banking security level procedures may be used to prevent this to happen. To avoid that vulnerabilities get introduced in code running in enclave, the enclaves may be operated at a minimal size, and the enclave code may be checked by a very intensive security review.

More details and aspects of the guard wallet concept are mentioned in connection with the proposed concept, or one or more examples described above or below (e.g., FIG. 1*a* to 1*c*). The guard wallet concept may comprise one or more additional optional features corresponding to one or more aspects of the proposed concept, or one or more examples described above or below.

Some examples of the proposed concept relate to:

(1) A wallet control apparatus (110), the wallet control apparatus comprising processing circuitry (114) configured to:
 register a new first cryptographic secret at a cryptocurrency wallet hosted in a trusted execution environment on a first remote server (120), by:
 generating the first cryptographic secret,
 obtaining a second cryptographic secret from a second remote server (130) upon authentication of an owner of the cryptocurrency wallet vis-à-vis the second remote server,
 signing a control instruction for registering the first cryptographic secret at the cryptocurrency wallet using the second cryptographic secret, and
 transmitting the signed control instruction for registering the first cryptographic secret at the cryptocurrency wallet to the first remote server; and
 provide instructions for controlling the cryptocurrency wallet to the first remote server, the instructions being cryptographically protected based on the first cryptographic secret.

(2) The wallet control apparatus according to (1), wherein the processing circuitry is configured to register the new first cryptographic secret after loss of a previously used first cryptographic secret.

(3) The wallet control apparatus according to one of (1) or (2), wherein the first cryptographic secret is a private key of a device authorization key pair, with the processing circuitry being configured to derive a public key of the device authorization key pair from the private key of the device authorization key pair, and to include the public key of the device authorization key pair in the control instruction for registering the first cryptographic secret.

(4) The wallet control apparatus according to one of (1) to (3), wherein the second cryptographic secret is a private key of a device registration key pair, with a public key of the device registration key pair being known to the cryptocurrency wallet.

(5) The wallet control apparatus according to (4), wherein the processing circuitry is configured to obtain a response from the first remote server in response to the signed control instruction for registering the first cryptographic secret at the cryptocurrency wallet, with the response comprising a confirmation of the cryptocurrency wallet if the private key of the device registration key pair matches the public key of the device registration key pair stored in the cryptocurrency wallet.

(6) The wallet control apparatus according to one of (1) to (5), wherein the control instruction for registering the first cryptographic secret at the cryptocurrency wallet comprises a first instruction for removing a previously used first cryptographic secret from the cryptocurrency wallet and a second instruction for registering the new first cryptographic secret at the cryptocurrency wallet.

(7) The wallet control apparatus according to one of (1) to (6), wherein the processing circuitry is configured to authenticate the owner of the cryptocurrency wallet vis-à-vis the second remote server by providing a signed identification certificate to the second remote server, the signed identification certificate being signed by an independent entity, and to obtain the second cryptographic secret in response to the authentication.

(8) The wallet control apparatus according to (7), wherein the processing circuitry of the wallet control apparatus is configured to authenticate the owner of the cryptocurrency wallet vis-à-vis the second remote server by signing an instruction with a private key linked with the identification certificate, so the signed instruction can be verified using the signed identification certificate.

(9) The wallet control apparatus according to one of (7) or (8), wherein the processing circuitry is configured to obtain the signed identification certificate from the independent entity.

(10) The wallet control apparatus according to one of (7) to (9), wherein the processing circuitry is configured to include the signed identification certificate with a subset of instructions for controlling the cryptocurrency wallet.

(11) The wallet control apparatus according to one of (1) to (6), wherein the authentication of the owner of the cryptocurrency wallet vis-à-vis the second remote server is performed outside the wallet control apparatus.

(12) A mobile device comprising the wallet control apparatus according to one of (1) to (11).

(13) A system comprising the wallet control apparatus (110) according to one of (1) to (11) and the second remote server (130), the second remote server comprising storage circuitry (136) configured to store the second cryptographic secret, and processing circuitry (134) configured to provide the second cryptographic secret in response to authentication of the owner of the cryptocurrency wallet vis-à-vis the second remote server.

(14) The system according to (13), wherein the processing circuitry of the second remote server is configured to authenticate the owner vis-à-vis the second remote server based on a signed identification certificate of the owner and based on information on an identity of the owner of the cryptocurrency wallet stored on the second remote server, the signed identification certificate being signed by an independent entity.

(15) The system according to (14), wherein the processing circuitry of the second remote server is configured to obtain the signed identification certificate from the wallet control apparatus.

(16) The system according to (14), wherein the processing circuitry of the second remote server is configured to obtain the signed identification certificate from another entity separate from the wallet control apparatus.

(17) The system according to one of (14) to (16), wherein the signature of the signed identification certificate is derived from a trust anchor, the processing circuitry of the second remote server being configured to verify the signed identification certificate based on a public key of the trust anchor.

(18) The system according to one of (13) to (17), comprising two or more second remote servers, wherein the processing circuitry of the wallet control apparatus is configured to obtain the second cryptographic secret from the two or more second remote servers.

(19) The system according to (18), wherein the processing circuitry of the wallet control apparatus is configured to select one of the two or more second remote servers, and to obtain the second cryptographic secret from the selected second remote server.

(20) The system according to (18), wherein the processing circuitry of the wallet control apparatus is configured to obtain two or more parts of the second cryptographic secret from the two or more remote servers, and to combine the two or more parts to obtain the second cryptographic secret.

(21) The system according to one of (13) to (20), further comprising the first remote server (120), the first remote server comprising processing circuitry (124) being configured to provide the trusted execution environment, and to perform operations concerning the cryptocurrency wallet inside the trusted execution environment.

(22) The system according to (21), wherein the first cryptographic secret is a private key of a device authorization key pair, the control instruction for registering the first cryptographic secret comprising the public key of the device authorization key pair, the processing circuitry of the first remote server being configured to store the public key of the device authorization key pair in the cryptocurrency wallet in the trusted execution environment.

(23) The system according to one of (21) or (22), wherein the second cryptographic secret is a private key of a device registration key pair, the processing circuitry of the first remote server being configured to store the public key of the device registration key pair in the cryptocurrency wallet in the trusted execution environment, and to verify the signed control instruction for registering the first cryptographic secret based on the public key of the device registration key pair.

(24) The system according to one of (21) to (23), wherein the processing circuitry of the first remote server is configured to store a third cryptographic secret for signing transactions on a cryptocurrency blockchain in the cryptocurrency wallet in the trusted execution environment, and to sign the transactions on the cryptocurrency blockchain using the third cryptographic secret.

(25) The system according to one of (21) to (24), wherein the processing circuitry of the first remote server is configured to store a public key of a trust anchor and to store information on an identity of the owner of the cryptocurrency wallet in the wallet in the trusted execution environment.

(26) The system according to (25), wherein a subset of instructions for controlling the cryptocurrency wallet require inclusion of a signed identification certificate of the owner of the cryptocurrency wallet, the signature of the signed identification certificate being derived from the trust anchor, the processing circuitry of the first remote server being configured to verify the subset of instructions based on the information on the signed identification certificate, based on the information on the identity of the owner of the cryptocurrency wallet and based on the public key of the trust anchor.

(27) The system according to one of (25) or (26), wherein the second remote server is configured to provide confirmation information on the second cryptographic secret being stored by the second remote server to the first remote server, the confirmation information including the information on the identity of the owner of the cryptocurrency wallet.

(28) The system according to one of (21) to (27), wherein software code running in the trusted execution environment is audited by a third party.

(29) A wallet control method comprising:
- registering (10) a new first cryptographic secret at a cryptocurrency wallet hosted in a trusted execution environment on a first remote server, by:
- generating (12) the first cryptographic secret,
- obtaining (14) a second cryptographic secret from a second remote server upon authentication of an owner of the cryptocurrency wallet vis-à-vis the second remote server,
- signing (16) a control instruction for registering the first cryptographic secret at the cryptocurrency wallet using the second cryptographic secret, and
- transmitting (18) the signed control instruction for registering the first cryptographic secret at the cryptocurrency wallet to the first remote server; and
- providing (20) instructions for controlling the cryptocurrency wallet to the first remote server, the instructions being cryptographically protected based on the first cryptographic secret.

(30) A computer program having a program code for performing the method of (29), when the computer program is executed on a computer, a processor, or a programmable hardware component.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions,-processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A wallet control apparatus, the wallet control apparatus comprising processing circuitry configured to:
- register a new first cryptographic secret at a cryptocurrency wallet hosted in a trusted execution environment on a first remote server, wherein the processing circuitry for registering the new first cryptographic secret is further configured to generate the first cryptographic secret,
- obtain a second cryptographic secret from a second remote server that provides a government-backed authentication structure separate from the first remote server, wherein the second cryptographic secret is obtained upon authentication of an owner of the cryptocurrency wallet vis-à-vis the second remote server using a signed identification certificate that is signed by an independent entity operating the second remote server and is renewable through the government entity upon loss,
- sign a control instruction for registering the first cryptographic secret at the cryptocurrency wallet using the second cryptographic secret,
- transmit the signed control instruction for registering the first cryptographic secret at the cryptocurrency wallet to the first remote server, and
- provide instructions for controlling the cryptocurrency wallet to the first remote server, the instructions being cryptographically protected based on the first cryptographic secret,
- wherein the cryptocurrency wallet stores, within the trusted execution environment, a third cryptographic secret for signing transactions on a cryptocurrency blockchain, and wherein the operations on cryptographic assets comprise signing one or more transactions on the cryptocurrency blockchain inside the trusted execution environment using the third cryptographic secret.

2. The wallet control apparatus according to claim 1, wherein the processing circuitry is configured to register the new first cryptographic secret after loss of a previously used first cryptographic secret.

3. The wallet control apparatus according to claim 1, wherein the first cryptographic secret is a private key of a device authorization key pair, with the processing circuitry being configured to derive a public key of the device authorization key pair from the private key of the device authorization key pair, and to include the public key of the device authorization key pair in the control instruction for registering the first cryptographic secret.

4. The wallet control apparatus according to claim 1, wherein the second cryptographic secret is a private key of a device registration key pair, with a public key of the device registration key pair being known to the cryptocurrency wallet.

5. The wallet control apparatus according to claim 1, wherein the control instruction for registering the first cryptographic secret at the cryptocurrency wallet comprises a first instruction for removing a previously used first cryptographic secret from the cryptocurrency wallet and a second instruction for registering the new first cryptographic secret at the cryptocurrency wallet.

6. The wallet control apparatus according to claim 1, wherein the processing circuitry is configured to authenticate the owner of the cryptocurrency wallet vis-à-vis the second remote server by providing a signed identification certificate to the second remote server, the signed identification certificate being signed by the independent entity, and to obtain the second cryptographic secret in response to the authentication.

7. The wallet control apparatus according to claim 6, wherein the processing circuitry is configured to authenticate the owner of the cryptocurrency wallet vis-à-vis the second remote server by signing an instruction with a private key linked with the identification certificate, so the signed instruction can be verified using the signed identification certificate.

8. The wallet control apparatus according to claim 6, wherein the processing circuitry is configured to obtain the signed identification certificate from the independent entity.

9. The wallet control apparatus according to claim 6, wherein the processing circuitry is configured to include the signed identification certificate with a subset of instructions for controlling the cryptocurrency wallet.

10. A system comprising the wallet control apparatus according to claim 1 and the second remote server, the second remote server comprising storage circuitry configured to store the second cryptographic secret, and processing circuitry configured to provide the second cryptographic secret in response to authentication of the owner of the cryptocurrency wallet vis-à-vis the second remote server.

11. The system according to claim 10, wherein the processing circuitry of the second remote server is configured to authenticate the owner vis-à-vis the second remote server based on a signed identification certificate of the owner and based on information on an identity of the owner of the cryptocurrency wallet stored on the second remote server, the signed identification certificate being signed by the independent entity.

12. The system according to claim 11, wherein the signature of the signed identification certificate is derived from a trust anchor, the processing circuitry of the second remote server being configured to verify the signed identification certificate based on a public key of the trust anchor.

13. The system according to claim 10, comprising two or more second remote servers, wherein the processing circuitry of the wallet control apparatus is configured to obtain the second cryptographic secret from the two or more second remote servers.

14. The system according to claim 10, further comprising the first remote server, the first remote server comprising processing circuitry being configured to provide the trusted execution environment, and to perform operations concerning the cryptocurrency wallet inside the trusted execution environment.

15. The system according to claim 14, wherein the second cryptographic secret is a private key of a device registration key pair, the processing circuitry of the first remote server being configured to store the public key of the device registration key pair in the cryptocurrency wallet in the trusted execution environment, and to verify the signed control instruction for registering the first cryptographic secret based on the public key of the device registration key pair.

16. The system according to claim 14, wherein the processing circuitry of the first remote server is configured to store a public key of a trust anchor and to store information on an identity of the owner of the cryptocurrency wallet in the wallet in the trusted execution environment.

17. The system according to claim 16, wherein a subset of instructions for controlling the cryptocurrency wallet require inclusion of a signed identification certificate of the owner of the cryptocurrency wallet, the signature of the signed identification certificate being derived from the trust anchor, the processing circuitry of the first remote server being configured to verify the subset of instructions based on the information on the signed identification certificate, based on the information on the identity of the owner of the cryptocurrency wallet and based on the public key of the trust anchor.

18. The system according to claim 14, wherein the second remote server is configured to provide confirmation information on the second cryptographic secret being stored by the second remote server to the first remote server, the confirmation information including the information on the identity of the owner of the cryptocurrency wallet.

19. A wallet control method comprising:

registering a new first cryptographic secret at a cryptocurrency wallet hosted in a trusted execution environment on a first remote server, by:

generating the first cryptographic secret, obtaining a second cryptographic secret from a second remote server that provides a government-backed authentication structure separate from the first remote server, wherein the second cryptographic secret is obtained upon authentication of an owner of the cryptocurrency wallet vis-à-vis the second remote server using a signed identification certificate that is signed by an independent entity operating the second remote server and is renewable through the government entity upon loss, signing a control instruction for registering the first cryptographic secret at the cryptocurrency wallet using the second cryptographic secret, and transmitting the signed control instruction for registering the first cryptographic secret at the cryptocurrency wallet to the first remote server; and providing instructions for controlling the cryptocurrency wallet to the first remote server, the instructions being cryptographically protected based on the first cryptographic secret, wherein the cryptocurrency wallet stores, within the trusted execution environment, a third cryptographic secret for signing transactions on a cryptocurrency blockchain, and wherein the operations on cryptographic assets comprise signing one or more transactions on the cryptocurrency blockchain inside the trusted execution environment using the third cryptographic secret.

20. A non-transitory computer-readable storage medium storing computer-readable instructions thereon which, when executed on a computer, a processor, or a programmable hardware component, perform the method of claim 19.

* * * * *